US012034627B2

(12) United States Patent
Zhang et al.

(10) Patent No.: US 12,034,627 B2
(45) Date of Patent: Jul. 9, 2024

(54) METHOD AND APPARATUS FOR EVALUATING IMPACT OF NETWORK OPERATION, AND DEVICE

(71) Applicant: Huawei Technologies Co., Ltd., Shenzhen (CN)

(72) Inventors: Yinxi Zhang, Nanjing (CN); Yang Zhou, Shenzhen (CN); Bin Yu, Nanjing (CN); Jiayuan Yang, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/059,674

(22) Filed: Nov. 29, 2022

(65) Prior Publication Data

US 2023/0087249 A1 Mar. 23, 2023

Related U.S. Application Data

(63) Continuation of application No. PCT/CN2021/096895, filed on May 28, 2021.

(30) Foreign Application Priority Data

May 30, 2020 (CN) .......................... 202010480913.3

(51) Int. Cl.
*H04L 43/50* (2022.01)
*H04L 41/14* (2022.01)
*H04L 43/0811* (2022.01)

(52) U.S. Cl.
CPC ............ *H04L 43/50* (2013.01); *H04L 41/145* (2013.01); *H04L 43/0811* (2013.01)

(58) Field of Classification Search
CPC ..... H04L 43/50; H04L 43/08; H04L 43/0805; H04L 43/0811; H04L 43/0817;
(Continued)

(56) References Cited

U.S. PATENT DOCUMENTS 7,031,895 B1 * 4/2006 Takahashi ............. H04L 41/147
703/13
7,729,287 B2 6/2010 Griffiths
(Continued)

FOREIGN PATENT DOCUMENTS

CN 103634290 A 3/2014
CN 110278111 A 9/2019
(Continued)

OTHER PUBLICATIONS

Huan Liu, Dan Orban "Remote Network Labs: an on-Demand Network Cloud for Configuration Testing" Jan. 2010, pp. 83-91, ACM SIGCOMM Computer Communication Review, vol. 40, No. 1 (Year: 2010).*
(Continued)

*Primary Examiner* — Rachel J Hackenberg
(74) *Attorney, Agent, or Firm* — Slater Matsil, LLP

(57) ABSTRACT

A method includes: obtaining a service intent, where the service intent is used to indicate to perform a first network operation on the target network; obtaining a mirror simulation network corresponding to the target network; determining verification content, where the verification content is used to perform simulation verification on a running state of the mirror simulation network; performing the first network operation on the mirror simulation network based on the service intent; and performing, after the first network operation is performed on the mirror simulation network, simulation verification on the mirror simulation network based on the verification content, to obtain a first verification result, where the first verification result is used to evaluate impact of the first network operation on the target network.

20 Claims, 12 Drawing Sheets

(58) Field of Classification Search
CPC ............ H04L 43/0823; H04L 43/0829; H04L 43/0847; H04L 43/0852; H04L 43/0858; H04L 43/0864; H04L 43/087; H04L 43/0876; H04L 43/0882; H04L 43/0888; H04L 43/0894; H04L 43/091; H04L 43/55; H04L 43/00; H04L 41/14; H04L 41/50; H04L 41/145
See application file for complete search history.

(56) References Cited

U.S. PATENT DOCUMENTS

| | | | |
|---|---|---|---|
| 10,819,618 B1 * | 10/2020 | Wada | H04L 43/50 |
| 10,834,264 B1 * | 11/2020 | Petropoulos | H04M 3/5232 |
| 2013/0297769 A1 * | 11/2013 | Chang | G06F 9/5077 709/224 |
| 2018/0115588 A1 | 4/2018 | Wysocki et al. | |
| 2018/0337830 A1 * | 11/2018 | Padhye | H04L 43/50 |
| 2020/0162315 A1 * | 5/2020 | Siddiqi | H04L 41/0677 |
| 2020/0336374 A1 * | 10/2020 | Clark | H04W 24/02 |
| 2022/0400114 A1 * | 12/2022 | Sreedhar | H04L 63/101 |

FOREIGN PATENT DOCUMENTS

| | | |
|---|---|---|
| CN | 110622137 A | 12/2019 |
| EP | 3522452 A1 | 8/2019 |

OTHER PUBLICATIONS

D. S. Anderson, M. Hibler, L. Stoller, T. Stack and J. Lepreau, "Automatic Online Validation of Network Configuration in the Emulab Network Testbed," 2006 IEEE International Conference on Autonomic Computing, Dublin, Ireland, 2006, pp. 134-142, doi: 10.1109/ICAC.2006.1662391. (Year: 2006).*

Cheng Zhou China Mobile P R China: "Technical implementation proposals on IBN system;I-xxx", ITU-T Draft; Study Period 2017-2020; Focus Group NET-2030; Series I-XXX, International Telecommunication Union, Geneva; Ch vol. 3 Aug. 20, 2019, XP044273340, 8 pages.

Alex Galis (Editor) et al: "Network 2030 Management Architecture (contribution to Section 5.1.7 of the Architecture document);WG3 123", ITU-T Draft; Study Period 2017-2020; Focus Group NET-2030; Series WG3-123, International Telecommunication Union, Mar. 12, 2020, XP044289492, 17 pages.

* cited by examiner

METHOD AND APPARATUS FOR EVALUATING IMPACT OF NETWORK OPERATION, AND DEVICE

CROSS-REFERENCE TO RELATED APPLICATIONS

This application is a continuation of International Application No. PCT/CN2021/096895, filed on May 28, 2021, which claims priority to Chinese Patent Application No. 202010480913.3, filed on May 30, 2020. The disclosures of the aforementioned applications are hereby incorporated by reference in their entireties.

TECHNICAL FIELD

This application relates to the field of computer technologies, and in particular, to a method and an apparatus for evaluating impact of a network operation, and a device.

BACKGROUND

With change and development of a service, a network in an area needs to be optimized or changed. For example, in an enterprise campus, with deepening of enterprise digital transformation, many Internet of Things terminals will access an original network. Therefore, the original network needs to be changed. For another example, in a network, a delay of transmitting a data stream from one Internet Protocol (IP) address to another IP address is serious. Therefore, an original network needs to be optimized, to reduce the delay.

However, a change operation or an optimization operation performed on a network greatly affects a service carried by the network, and an incorrect change operation or optimization operation, for example, an incorrect configuration or an incorrect connection, has a catastrophic impact on the carried service.

Therefore, before the change operation or the optimization operation is performed on the network, impact of the change operation or the optimization operation needs to be evaluated. In this way, an operation can be adjusted in a timely manner based on an evaluation result, to reduce negative impact of the change operation or the optimization operation on an original service on the network.

A current test method is as follows. A test network that is the same as an original network is first set up, and then the change operation or the optimization operation is performed on the test network, to obtain impact of the change operation or the optimization operation.

It is difficult to set up a test network and the original network that are in 1:1. Therefore, accuracy of evaluating the impact of the change operation or the optimization operation by using this method is low.

SUMMARY

This application provides a method and an apparatus for evaluating impact of a network operation, and a device, to accurately evaluate impact of the network operation on a target network.

According to a first aspect, a method for evaluating impact of a network operation is provided, including: a control device obtains a service intent, where the service intent is used to indicate to perform a first network operation on a target network, the first network operation may have a plurality of choices, for example, may include network optimization and/or a network change, and the service intent may further indicate a time point at which the first network operation is performed on the target network; the control device obtains a mirror simulation network corresponding to the target network; the control device determines verification content, where the verification content is used to perform simulation verification on a running state of the mirror simulation network; the control device performs the first network operation on the mirror simulation network based on the service intent; and the control device performs, after performing the first network operation on the mirror simulation network, simulation verification on the mirror simulation network in a sandbox environment based on the verification content, to obtain a first verification result, where the first verification result is used to evaluate impact of the first network operation on the target network.

Because the mirror simulation network can accurately reflect the target network, performing the first network operation on the mirror simulation network corresponding to the target network can better simulate performing the first network operation on the target network. Then, simulation verification is performed based on the verification content, to obtain the first verification result. The first verification result can reflect the running state of the mirror simulation network. Therefore, the impact of the first network operation on the target network can be accurately evaluated based on the first verification result.

Based on the first aspect, in a first implementation of the first aspect, that the control device determines verification content includes: the control device determines a type of the verification content, where the type of the verification content may include service information expected by a user, security compliance, an optimal path for data transmission, Internet of Things isolation, and the like; and the control device obtains the verification content based on the type of the verification content. The obtained verification content varies based on the type of the verification content.

This implementation provides a feasible solution for obtaining the verification content. In other words, the type of the verification content is obtained first, and then the verification content is obtained based on the type of the verification content.

Based on the first implementation of the first aspect, in a second implementation of the first aspect, the type of the verification content is the service information; and that the control device obtains the verification content based on the type of the verification content includes: the control device obtains, after performing the first network operation on the target network, a first service parameter that is of the target network in a running state and that is expected by the user.

The first service parameter may include a plurality of types, for example, may include a service flow parameter, and may specifically include a connectivity status of a service flow, a delay of the service flow, jitter of the service flow, and bandwidth of the service flow, or may include an application parameter, and may specifically include a delay of an application, jitter of the application, and bandwidth of the application.

This implementation provides a specific solution for obtaining the verification content based on the type of the verification content.

Based on the second implementation of the first aspect, in a third implementation of the first aspect, that the control device obtains, after performing the first network operation on the target network, a first service parameter that is of the target network in a running state and that is expected by the user includes: the control device obtains a second service parameter that is of the target network in a current running state, where the second service parameter, for example, includes a current connectivity status of the service flow, a current delay of the service flow, current jitter of the service flow, and current bandwidth of the service flow; the control device obtains first modification information based on content input by the user, where the first modification information is used to indicate to modify the second service parameter; and the control device modifies the second service parameter based on the first modification information, and uses a modified second service parameter as the first service parameter that is of the target network in the running state and that is expected by the user.

This implementation provides a feasible solution for obtaining the first service parameter. In other words, modification is performed based on the second service parameter, to obtain the first service parameter, to improve efficiency of obtaining the first service parameter.

Based on the second implementation of the first aspect, or the third implementation of the first aspect, in a fourth implementation of the first aspect, that the control device performs, after performing the first network operation on the mirror simulation network, simulation verification on the mirror simulation network based on the verification content, to obtain a first verification result includes: the control device obtains, after performing the first network operation on the mirror simulation network, a third service parameter that is of the mirror simulation network in the running state in the sandbox environment; and the control device generates a first comparison result between the first service parameter and the third service parameter. The first comparison result has a plurality of forms, for example, includes a comparison result between the first service parameter and the third service parameter, or may include a difference between the first service parameter and the third service parameter.

The first comparison result may more intuitively reflect the difference between the first service parameter expected by the user and the actual third service parameter of the mirror simulation network.

Based on the first implementation of the first aspect, or the second implementation of the first aspect, or the third implementation of the first aspect, or the fourth implementation of the first aspect, in a fifth implementation of the first aspect, the service intent is used to indicate to add a first network device to the target network; and that the control device obtains, after performing the first network operation on the mirror simulation network, a third service parameter that is of the mirror simulation network in the running state includes: the control device obtains, after the first network device is added to the mirror simulation network, a third service parameter that is of the first network device in a running state.

Based on the first implementation of the first aspect, or the second implementation of the first aspect, or the third implementation of the first aspect, or the fourth implementation of the first aspect, in a sixth implementation of the first aspect, the service intent is used to indicate to adjust an access-control list of a second network device in the target network; and that the control device obtains, after performing the first network operation on the mirror simulation network, a third service parameter that is of the mirror simulation network in the running state includes: the control device obtains, after the access-control list of the second network device in the target network is adjusted, a service flow that passes through the second network device.

Based on the first implementation of the first aspect, or the second implementation of the first aspect, or the third implementation of the first aspect, or the fourth implementation of the first aspect, or the fifth implementation of the first aspect, or the sixth implementation of the first aspect, in a seventh implementation of the first aspect, that the control device determines a type of the verification content includes: The control device generates the type of the verification content based on the service intent.

This implementation provides a feasible solution for generating the type of the verification content. The type of the verification content is automatically generated based on the service intent.

Based on the seventh implementation of the first aspect, in an eighth implementation of the first aspect, after the control device generates the type of the verification content based on the service intent, the method further includes: the control device obtains second modification information, where the second modification information is used to indicate to modify the type of the verification content; and the control device modifies the type of the verification content based on the second modification information.

This implementation provides a feasible solution for obtaining the type of the verification content. In other words, the automatically generated type of the verification content is modified, to obtain a final type of the verification content, to improve efficiency of obtaining the type of the verification content.

Based on the first aspect, or the first implementation of the first aspect, or the second implementation of the first aspect, or the third implementation of the first aspect, or the fourth implementation of the first aspect, or the fifth implementation of the first aspect, or the sixth implementation of the first aspect, or the seventh implementation of the first aspect, or the eighth implementation of the first aspect, in a ninth implementation of the first aspect, that the control device obtains a mirror simulation network corresponding to the target network includes: the control device obtains network information of the target network. The network information may include a topology structure, configuration plane information, and forwarding plane information of the target network. The configuration plane information may include one or more of a link state, an interface state, interface bandwidth, an uplink rate, and a downlink rate. The forwarding plane information may include one or more of a Layer 2 forwarding table and a Layer 3 forwarding table.

In a sandbox environment, the mirror simulation network corresponding to the target network is constructed based on the network information.

This implementation provides a feasible solution for obtaining the mirror simulation network.

Based on the first aspect, or the first implementation of the first aspect, or the second implementation of the first aspect, or the third implementation of the first aspect, or the fourth implementation of the first aspect, or the fifth implementation of the first aspect, or the sixth implementation of the first aspect, or the seventh implementation of the first aspect, or the eighth implementation of the first aspect, or the ninth implementation of the first aspect, in a tenth implementation of the first aspect, the method further includes: the control device may send, based on the fact that the first verification result meets a preset requirement, first configuration information to the target network at a time point indicated by the service intent. The first configuration information is used to indicate the target network to perform configuration related to the first network operation.

In this implementation, the first configuration information is delivered, so that the target network performs configuration related to the first network operation, to complete the first network operation on the target network.

Based on the first aspect, or the first implementation of the first aspect, or the second implementation of the first aspect, or the third implementation of the first aspect, or the fourth implementation of the first aspect, or the fifth implementation of the first aspect, or the sixth implementation of the first aspect, or the seventh implementation of the first aspect, or the eighth implementation of the first aspect, or the ninth implementation of the first aspect, in an eleventh implementation of the first aspect, the method further includes: the control device generates a first network operation solution based on the fact that the first verification result does not meet a preset requirement. The first network operation solution is used to indicate to continue to perform a second network operation on the mirror simulation network, so that a second verification result obtained by performing simulation verification on the mirror simulation network based on the verification content meets the preset requirement.

In this implementation, because the first verification result does not meet the preset requirement, the first network operation solution is automatically generated. The first network operation solution is used to indicate to continue to perform the second network operation on the mirror simulation network, so that the second verification result obtained by performing simulation verification again can meet the preset requirement, to implement the first network operation performed on the target network.

Based on the eleventh implementation of the first aspect, in a twelfth implementation of the first aspect, after the control device generates the first network operation solution based on the fact that the first verification result does not meet the preset requirement, the method further includes: the control device performs the second network operation on the mirror simulation network based on the first network operation solution, where the second network operation may include a plurality of types, for example, may include newly adding a link between two devices in the target network, and may further include adjusting a transmission path of the service flow; and the control device performs, after performing the second network operation on the mirror simulation network, simulation verification on the mirror simulation network based on the verification content, to obtain the second verification result, where a form of the second verification result may be the same as a form of the first verification result.

In this implementation, the second network operation is performed on the mirror simulation network, and simulation verification is performed again on the mirror simulation network on which the second network operation is performed, to ensure that the obtained second verification result can meet the preset requirement.

Based on the twelfth implementation of the first aspect, in a thirteenth implementation of the first aspect, the method further includes: the control device sends second configuration information to the target network based on the fact that the second verification result meets the preset requirement. The second configuration information is used to indicate the target network to perform configuration related to the first network operation and configuration related to the second network operation.

In this implementation, the second configuration information is delivered, so that the target network performs configuration related to the first network operation and configuration related to the second network operation, to complete the first network operation and the second network operation that are performed on the target network.

Based on the first aspect, or the first implementation of the first aspect, or the second implementation of the first aspect, or the third implementation of the first aspect, or the fourth implementation of the first aspect, or the fifth implementation of the first aspect, or the sixth implementation of the first aspect, or the seventh implementation of the first aspect, or the eighth implementation of the first aspect, or the ninth implementation of the first aspect, in a fourteenth implementation of the first aspect, based on the fact that the first verification result does not meet a preset requirement, the method further includes: the control device generates a second network operation solution, where the second operation solution is used to indicate to perform a third network operation on the mirror simulation network; the control device performs the third network operation on the mirror simulation network based on the second network operation solution; the control device performs, after performing the third network operation on the mirror simulation network, simulation verification on the mirror simulation network based on the verification content, to obtain a third verification result; the control device repeatedly performs the foregoing steps until the third verification result meets the preset requirement; and the control device sends third configuration information to the target network, where the third configuration information is used to indicate the target network to perform configuration related to the first network operation and configuration related to the third network operation.

In this implementation, based on the fact that the first verification result does not meet the preset requirement, the control device automatically generates the second network operation solution, performs the second network operation solution on the mirror simulation network, then performs simulation verification on the mirror simulation network, and finally determines whether the third verification result meets the preset requirement. If the third verification result does not meet the preset requirement, the foregoing operations are cyclically performed, until the third verification result meets the preset requirement. In this way, the control device can automatically generate a network operation solution based on a service intent input by the user. The network operation solution can ensure that the running state of the target network can meet a requirement of the user after the first network operation is performed on the target network, to avoid negative impact of the first network operation on the target network.

Based on the tenth implementation of the first aspect, or the thirteenth implementation of the first aspect, or the fourteenth implementation of the first aspect, in a fifteenth implementation of the first aspect, the method further includes: the control device sends a packet to the target network, where the packet is used to indicate the target network to perform a dialing test; and the control device obtains a dialing test result, to determine that the dialing test result meets the preset requirement.

In this implementation, the target network is indicated to perform the dialing test, to ensure that the impact of the first network operation on the target network can meet the requirement of the user.

Based on the first aspect, or the first implementation of the first aspect, or the second implementation of the first aspect, or the third implementation of the first aspect, or the fourth implementation of the first aspect, or the fifth implementation of the first aspect, or the sixth implementation of the first aspect, or the seventh implementation of the first aspect, or the eighth implementation of the first aspect, or the ninth implementation of the first aspect, or the tenth implementation of the first aspect, or the eleventh implementation of the first aspect, in the twelfth implementation of the first aspect, the first network operation includes the network optimization and/or the network change.

According to a second aspect, an apparatus for evaluating impact of a network operation is provided, including: a first obtaining unit, configured to obtain a service intent, where the service intent is used to indicate to perform a first network operation on a target network; a second obtaining unit, configured to obtain a mirror simulation network corresponding to the target network; a verification content determining unit, configured to determine verification content, where the verification content is used to perform simulation verification on a running state of the mirror simulation network; a network operation unit, configured to perform the first network operation on the mirror simulation network based on the service intent; and a simulation verification unit, configured to perform, after the first network operation is performed on the mirror simulation network, simulation verification on the mirror simulation network based on the verification content, to obtain a first verification result, where the first verification result is used to evaluate impact of the first network operation on the target network.

Based on the second aspect, in a first implementation of the second aspect, the verification content determining unit is configured to: determine a type of the verification content; and obtain the verification content based on the type of the verification content.

Based on the first implementation of the second aspect, in a second implementation of the second aspect, the type of the verification content is service information; and the verification content determining unit is configured to: obtain, after the first network operation is performed on the target network, a first service parameter that is of the target network in a running state and that is expected by a user.

Based on the second implementation of the second aspect, in a third implementation of the second aspect, the verification content determining unit is configured to: obtain a second service parameter that is of the target network in a current running state; obtain first modification information, where the first modification information is used to indicate to modify the second service parameter; and modify the second service parameter based on the first modification information, and use a modified second service parameter as the first service parameter that is of the target network in the running state and that is expected by the user.

Based on the second implementation of the second aspect or the third implementation of the second aspect, in a fourth implementation of the second aspect, the simulation verification unit is configured to: obtain, after the first network operation is performed on the mirror simulation network, a third service parameter that is of the mirror simulation network in the running state in a sandbox environment; and generate a first comparison result between the first service parameter and the third service parameter.

Based on the first implementation of the second aspect, or the second implementation of the second aspect, or the third implementation of the second aspect, or the fourth implementation of the second aspect, in a fifth implementation of the second aspect, the service intent is used to indicate to add a first network device to the target network; and the simulation verification unit is configured to obtain, after the first network device is added to the mirror simulation network, a third service parameter that is of the first network device in a running state.

Based on the first implementation of the second aspect, or the second implementation of the second aspect, or the third implementation of the second aspect, or the fourth implementation of the second aspect, in a sixth implementation of the second aspect, the service intent is used to indicate to adjust an access-control list of a second network device in the target network; and the simulation verification unit is configured to obtain, after the access-control list of the second network device in the target network is adjusted, a service flow that passes through the second network device.

Based on the first implementation of the second aspect, or the second implementation of the second aspect, or the third implementation of the second aspect, or the fourth implementation of the second aspect, or the fifth implementation of the second aspect, or the sixth implementation of the second aspect, in a seventh implementation of the second aspect, the verification content determining unit is configured to generate the verification content based on the service intent.

Based on the seventh implementation of the second aspect, in an eighth implementation of the second aspect, the verification content determining unit is further configured to: obtain second modification information, where the second modification information is used to indicate to modify the verification content; and modify the verification content based on the second modification information.

Based on the second aspect, or the first implementation of the second aspect, or the second implementation of the second aspect, or the third implementation of the second aspect, or the fourth implementation of the second aspect, or the fifth implementation of the second aspect, or the sixth implementation of the second aspect, or the seventh implementation of the second aspect, or the eighth implementation of the second aspect, in a ninth implementation of the second aspect, the second obtaining unit is configured to: obtain network information of the target network; and construct, based on the network information, the mirror simulation network corresponding to the target network.

Based on the second aspect, or the first implementation of the second aspect, or the second implementation of the second aspect, or the third implementation of the second aspect, or the fourth implementation of the second aspect, or the fifth implementation of the second aspect, or the sixth implementation of the second aspect, or the seventh implementation of the second aspect, or the eighth implementation of the second aspect, or the ninth implementation of the second aspect, in a tenth implementation of the second aspect, the apparatus further includes: a sending unit, configured to send first configuration information to the target network based on the fact that the first verification result meets a preset requirement. The first configuration information is used to indicate the target network to perform configuration related to the first network operation.

Based on the second aspect, or the first implementation of the second aspect, or the second implementation of the second aspect, or the third implementation of the second aspect, or the fourth implementation of the second aspect, or the fifth implementation of the second aspect, or the sixth implementation of the second aspect, or the seventh implementation of the second aspect, or the eighth implementation of the second aspect, or the ninth implementation of the second aspect, in an eleventh implementation of the second aspect, the apparatus further includes: a network operation solution generating unit, configured to generate a network operation solution based on the fact that the first verification result does not meet a preset requirement. The first network operation solution is used to indicate to continue to perform a second network operation on the mirror simulation network, so that a second verification result obtained by performing simulation verification on the mirror simulation network based on the verification content meets the preset requirement.

Based on the eleventh implementation of the second aspect, in a twelfth implementation of the second aspect, the simulation verification unit is further configured to: perform the second network operation on the mirror simulation network based on the first network operation solution; and perform, after the second network operation is performed on the mirror simulation network, simulation verification on the mirror simulation network based on the verification content, to obtain the second verification result.

Based on the twelfth implementation of the second aspect, in a thirteenth implementation of the second aspect, the sending unit is further configured to send second configuration information to the target network based on the fact that the second verification result meets the preset requirement. The second configuration information is used to indicate the target network to perform configuration related to the first network operation and configuration related to the second network operation.

Based on the second aspect, or the first implementation of the second aspect, or the second implementation of the second aspect, or the third implementation of the second aspect, or the fourth implementation of the second aspect, or the fifth implementation of the second aspect, or the sixth implementation of the second aspect, or the seventh implementation of the second aspect, or the eighth implementation of the second aspect, or the ninth implementation of the second aspect, in a fourteenth implementation of the second aspect, based on the fact that the first verification result does not meet a preset requirement, the apparatus further includes a network operation solution generating unit and a sending unit.

The network operation solution generating unit is configured to generate a second network operation solution. The second operation solution is used to indicate to perform a third network operation on the mirror simulation network.

The simulation verification unit is further configured to: perform the third network operation on the mirror simulation network based on the second network operation solution; perform, after the third network operation is performed on the mirror simulation network, simulation verification on the mirror simulation network based on the verification content, to obtain a third verification result; and repeatedly perform the foregoing steps until the third verification result meets the preset requirement.

The sending unit is configured to send third configuration information to the target network. The third configuration information is used to indicate the target network to perform configuration related to the first network operation and configuration related to the third network operation.

Based on the tenth implementation of the second aspect, or the thirteenth implementation of the second aspect, or the fourteenth implementation of the second aspect, in a fifteenth implementation of the second aspect, the sending unit is further configured to: send a packet to the target network, where the packet is used to indicate the target network to perform a dialing test; and obtain a dialing test result, to determine that the dialing test result meets the preset requirement.

According to a third aspect, a control device is provided, including at least one processor and a memory. The memory stores computer-executable instructions that can be run on the processor. When the computer-executable instructions are executed by the processor, the terminal device performs the method for evaluating impact of a network operation according to any implementation of the foregoing first aspect.

According to a fourth aspect, a chip or a chip system is provided. The chip or the chip system includes at least one processor and a communication interface. The communication interface is interconnected to the at least one processor through a line. The at least one processor is configured to run a computer program or instructions, to perform the method for evaluating impact of a network operation according to any implementation of the foregoing first aspect.

According to a fifth aspect, a computer storage medium is provided. The computer storage medium is configured to store computer software instructions used by the foregoing terminal device. The computer software instructions are used to execute a program designed for a network device.

The network device may be the apparatus for evaluating impact of a network operation described in the foregoing second aspect.

According to a sixth aspect, a computer program product is provided. The computer program product includes computer software instructions. The computer software instructions may be loaded by a processor to implement the method for evaluating impact of a network operation according to any implementation of the foregoing first aspect.

According to a seventh aspect, a network system is provided, including a target network and a control device. The target network includes one or more network devices.

The control device is configured to perform the method for evaluating impact of a network operation according to any implementation of the foregoing first aspect.

The foregoing technical solutions have the following advantages.

First, the service intent is obtained. The service intent is used to indicate to perform the first network operation on the target network. Then, the mirror simulation network corresponding to the target network is obtained. The mirror simulation network can accurately reflect the target network. Then, the verification content is determined. The verification content is used to indicate to perform simulation verification on the mirror simulation network. Then, the first network operation is performed on the mirror simulation network based on the service intent, to simulate performing the first network operation on the target network. Finally, after the first network operation is performed on the mirror simulation network, simulation verification is performed on the mirror simulation network based on the verification content, to obtain the first verification result. The first verification result can reflect the running state of the mirror simulation network. Therefore, the impact of the first network operation on the target network can be accurately evaluated based on the first verification result.

DETAILED DESCRIPTION OF ILLUSTRATIVE EMBODIMENTS

Embodiments of this application provide a method and an apparatus for evaluating impact of a network operation, and a device, to accurately evaluate impact of the network operation on a target network.

Figure 1:
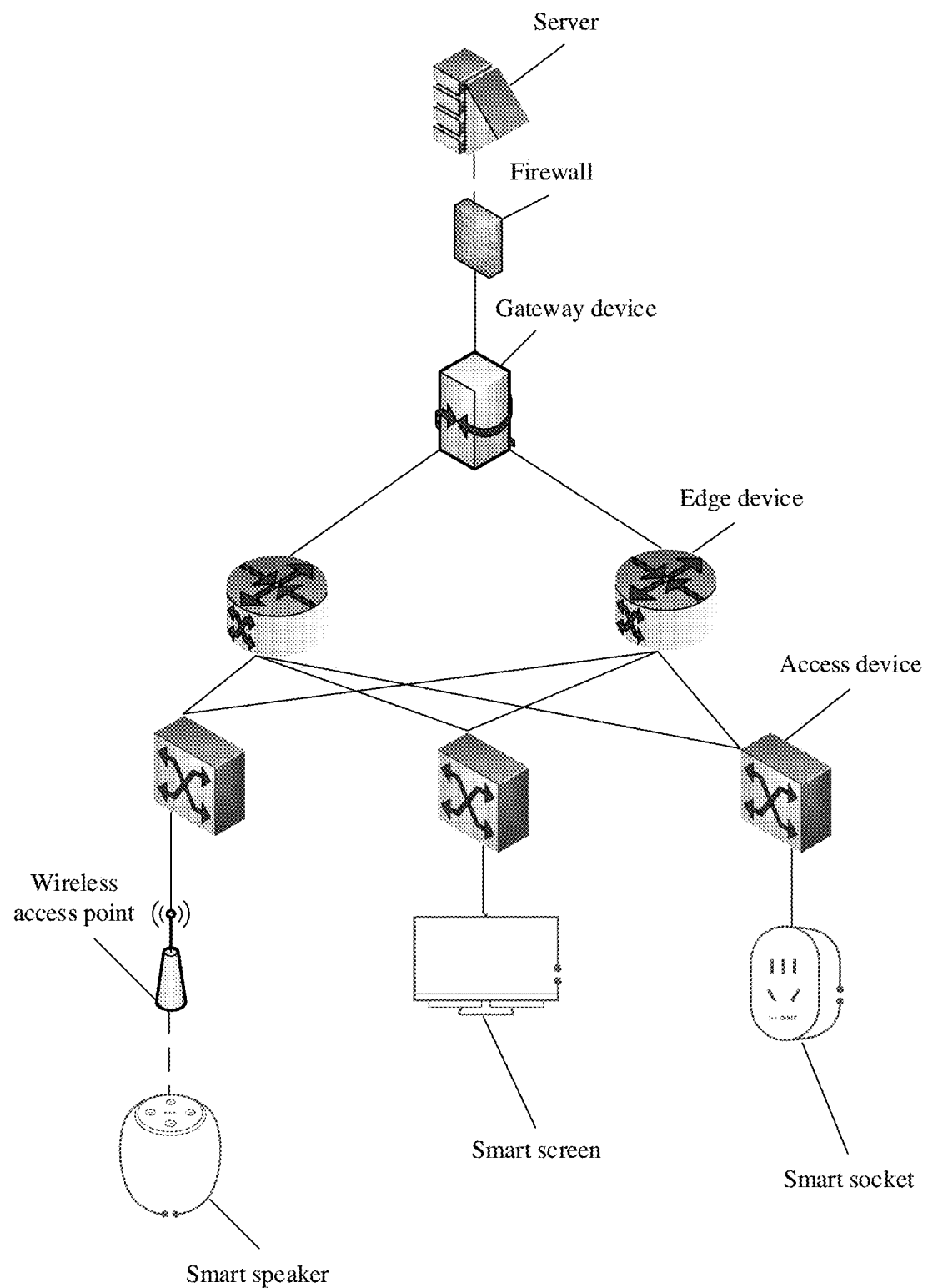
FIG. 1 is a schematic diagram of an architecture of an embodiment of a network system according to an embodiment of this application.

Embodiments of this application may be applied to a campus network system shown in FIG. 1. As shown in FIG. 1, the campus network system includes a gateway device, edge devices, access devices, a wireless access point, and a firewall. A first side of the gateway device is connected to a server by sequentially using an edge device, an access device, and the firewall, a second side of the gateway device is connected to a terminal device by sequentially using an edge device and an access device, and the second side of the gateway device is further connected to a terminal device by sequentially using an edge device, an access device, and the wireless access point.

The gateway device is also referred to as an inter-network connector or a protocol converter, and is a computer system or device that provides a data conversion service between a plurality of networks.

The edge device is a device that provides an entry point for a core network of an enterprise or a service provider. The edge device may include a router, a routing switch, an integrated access device (IAD), a multiplexer, and various metropolitan area network (MAN) access devices and wide area network (WAN) access devices.

The access device is usually configured to remotely access a network resource, and may include a router, a multiplexer, and a modulation regulator.

The terminal device may include a smartphone, a notebook computer, a tablet computer, and various Internet of Things terminal devices. In FIG. 1, the Internet of Things terminal device is used to represent the terminal device, and specifically includes a smart speaker, a smart screen, and a smart socket.

In addition, the campus network system further includes a control device. The control device is configured to configure a parameter of a network device in the campus network system, and monitor and manage the network device in the campus network system.

In actual application, based on a change of an actual requirement, network optimization and/or a network change usually needs to be performed on the campus network system shown in FIG. 1, to adapt to the actual requirement.

Figure 2:
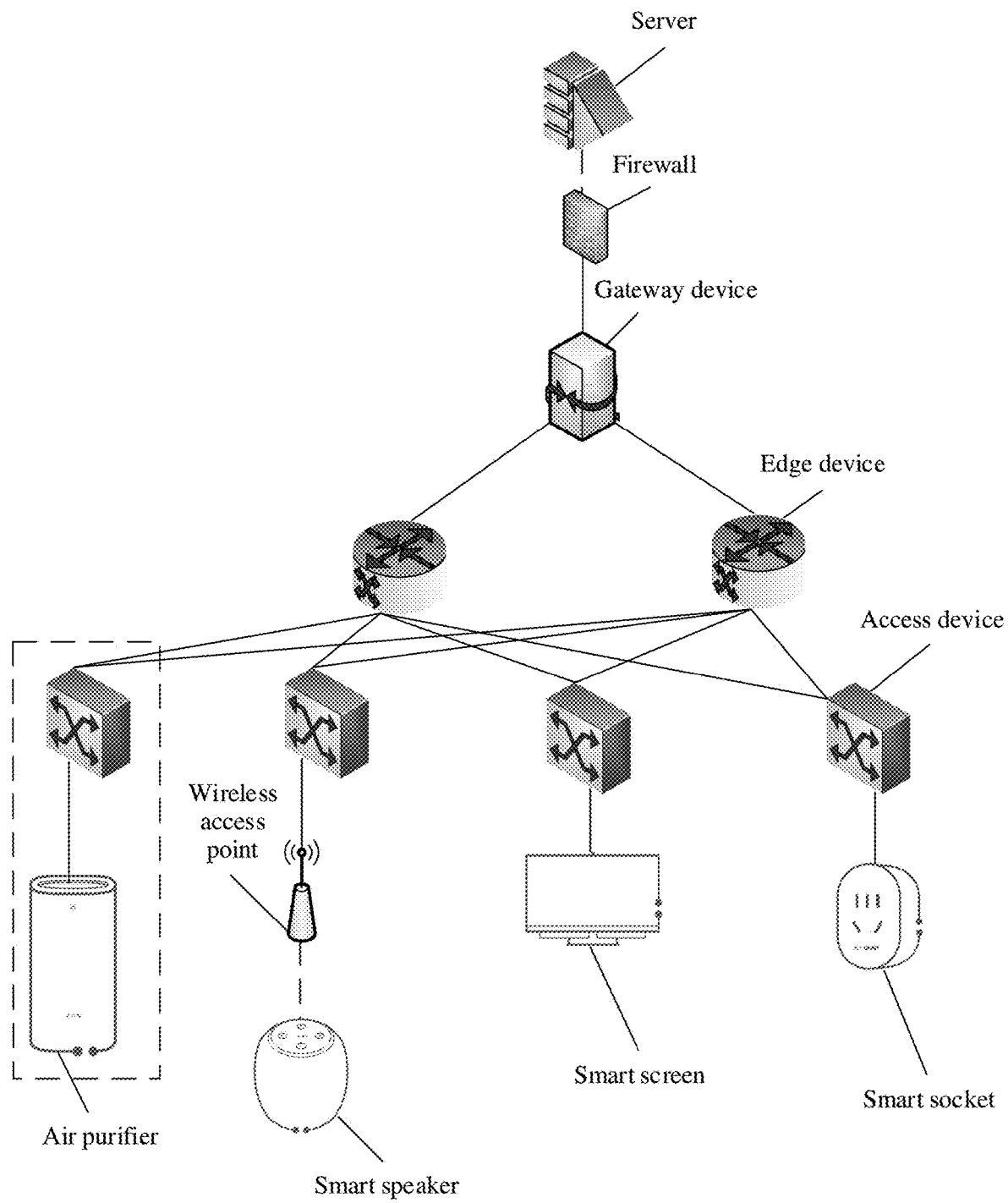
FIG. 2 is a schematic diagram of an architecture of another embodiment of a network system according to an embodiment of this application.

In this embodiment of this application, the network change includes replacing or removing any network device (which is the gateway device, the edge device, the access device, the wireless access point, or the firewall) in the campus network system shown in FIG. 1, and adding a new network device to the campus network system shown in FIG. 1. The campus network system shown in FIG. 1 is used as an example. An air purifier is added to an office building in a campus. Correspondingly, a network change needs to be performed on the campus network system shown in FIG. 1, that is, an access device needs to be added for access of the air purifier. FIG. 2 shows a campus network system obtained after the network change.

The network optimization includes modifying a configuration of any network device in the campus network system shown in FIG. 1. For example, the network optimization may include adjusting an access-control list of the network device, changing a quantity of links between two network devices, adjusting an optimal path for data transmission, and adjusting security compliance of the campus network system.

It should be understood that, regardless of the network change or the network optimization, a service carried by the campus network system may be greatly affected. Therefore, to reduce impact of the network optimization and the network change on the service, before network optimization and the network change are performed on the campus network system, the impact of the network optimization and the network change on the campus network system needs to be evaluated. In this way, the campus network system can be further adjusted based on an evaluation result, to reduce negative impact of the network optimization and the network change on an original service in the campus network system. For ease of description, the following uses a network operation to represent the network optimization and/or the network change, and uses a network to represent the network system.

Therefore, an embodiment of this application provides a method for evaluating impact of a network operation. The method can be applied to a control device in a network system. Specifically, the control device performs the network operation based on a mirror simulation network, then verifies the mirror simulation network on which the network operation is performed, and finally evaluates the impact of the network operation based on a verification result.

It should be noted that this embodiment of this application is applicable to any network system including a campus network system.

Figure 3:
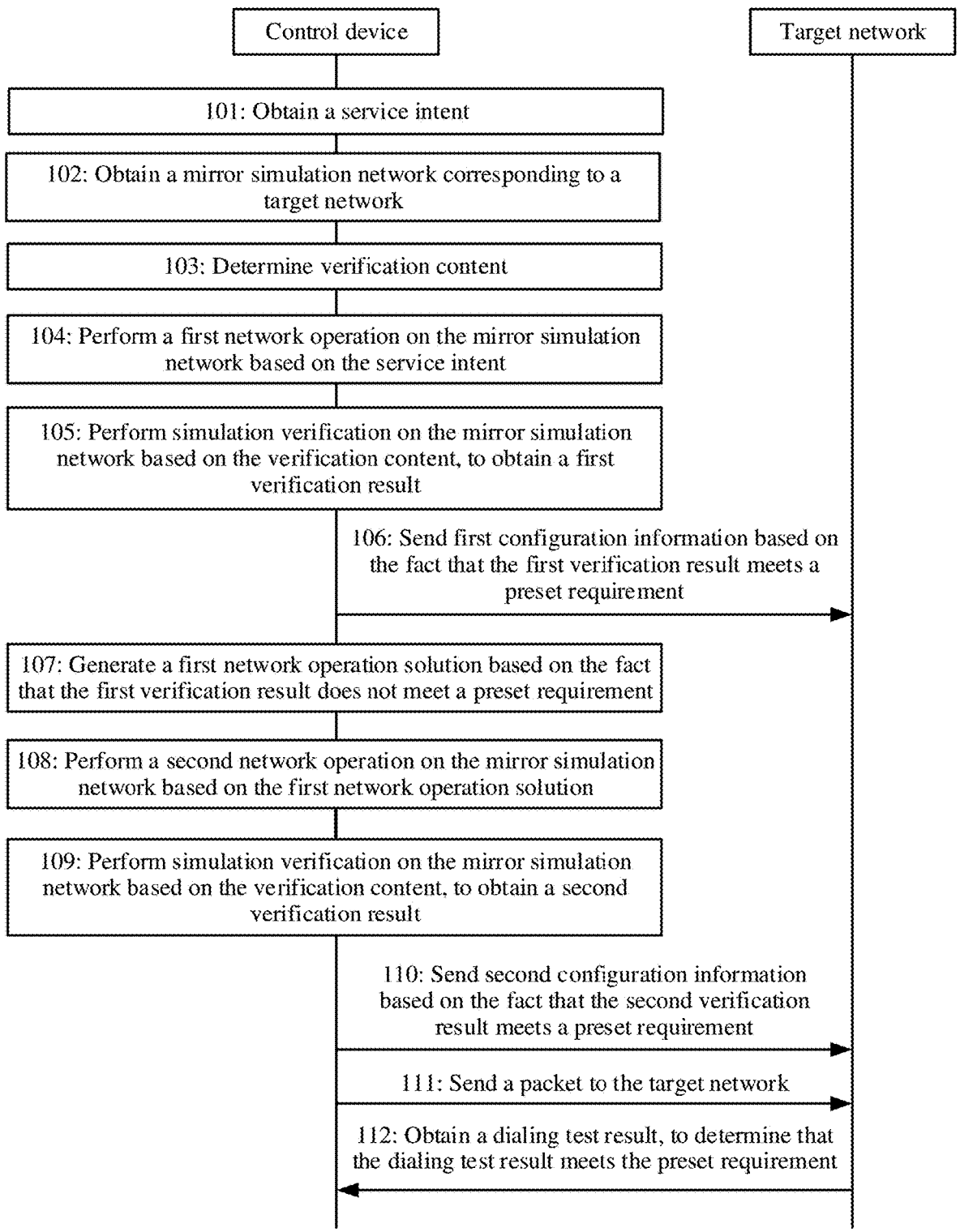
FIG. 3 is a schematic diagram of a first embodiment of a method for evaluating impact of a network operation according to an embodiment of this application.

Specifically, FIG. 3 is a schematic diagram of a first embodiment of a method for evaluating impact of a network operation according to an embodiment of this application. As shown in FIG. 3, this embodiment of this application provides an embodiment of the method for evaluating impact of a network operation. The method may be applied to a control device and includes the following steps.

Step 101: The control device obtains a service intent. The service intent is used to indicate to perform a first network operation on a target network.

The target network may be a network in which the control device is located, or may be another network other than a network in which the control device is located.

The first network operation may include network optimization and/or a network change. Because the network change and the network optimization have been described in the foregoing content, the network optimization and the network change in this embodiment of this application may be understood with reference to the foregoing descriptions.

There are a plurality of methods for obtaining the service intent. This is not limited in this embodiment of this application. For example, the service intent may be recognized based on information, for example, a text or voice input by a user. Alternatively, a plurality of service intent options may be first provided for a user to select, and then the service intent is determined based on a selection instruction of the user.

In another implementable manner, an input initial service intent may be obtained first, then Step 102 is performed to obtain a mirror simulation network corresponding to the target network, and then a final service intent is obtained based on an actual operation performed by a user on the mirror simulation network.

Figure 4:
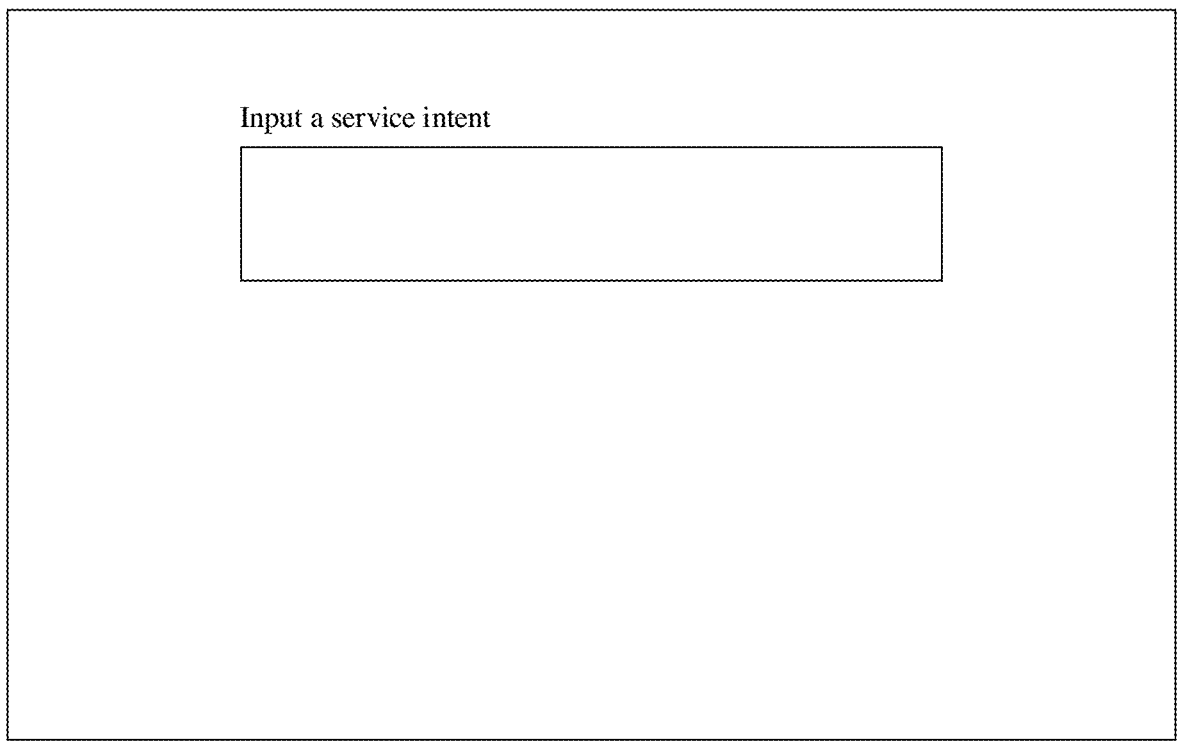
FIG. 4 is a schematic diagram of an embodiment of a first interface according to an embodiment of this application.

For example, as shown in FIG. 4, the user may input the initial service intent on a first interface shown in FIG. 4. Herein, it is assumed that the initial service intent is performing the network change on the target network.

Figure 5:
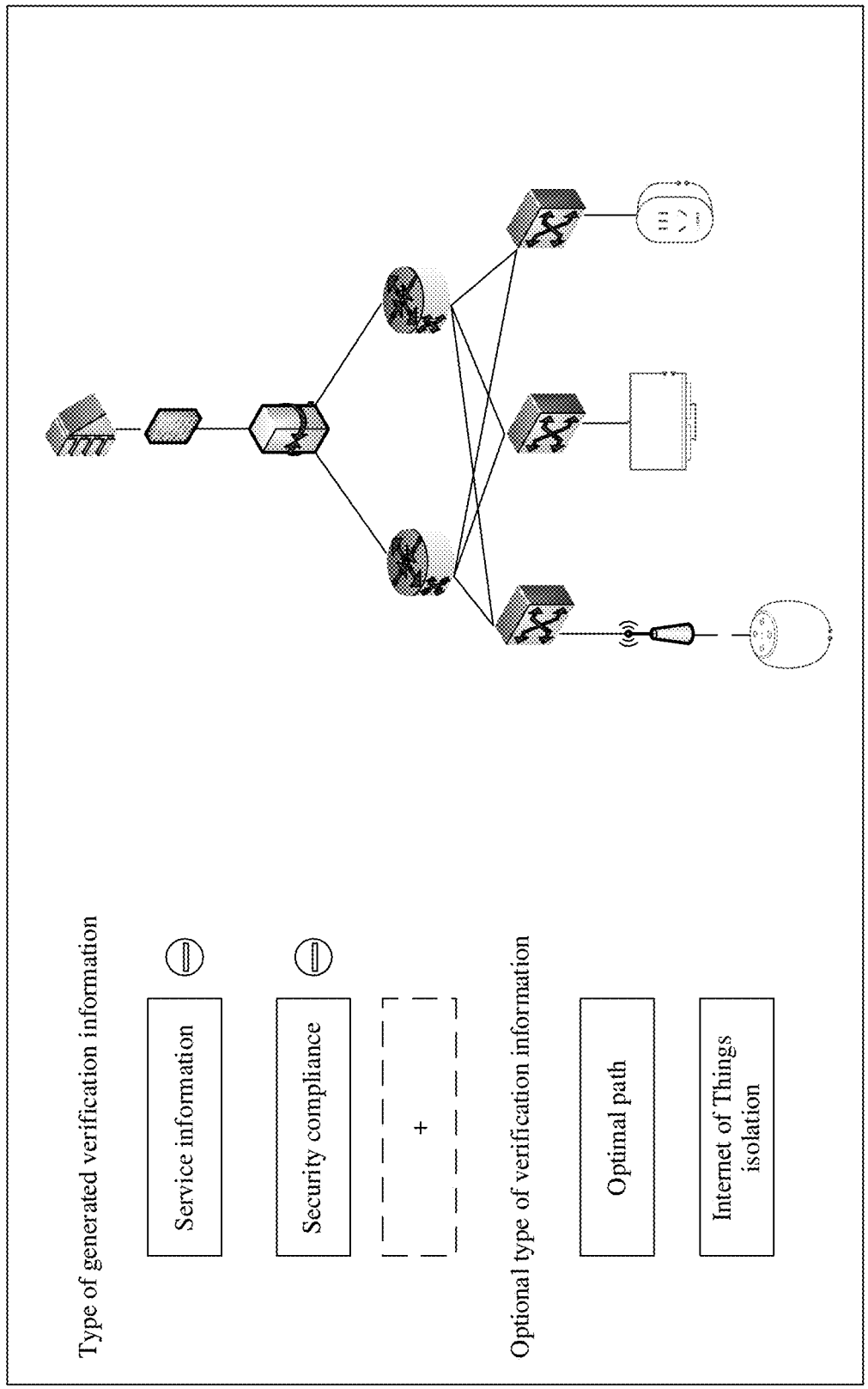
FIG. 5 is a schematic diagram of an embodiment of a second interface according to an embodiment of this application.

Correspondingly, the control device obtains the initial service intent, then obtains the mirror simulation network of the target network based on the initial service intent, and displays the mirror simulation network on a second interface shown in FIG. 5.

Then, the user may directly perform the first network operation on the mirror simulation network on the second interface shown in FIG. 5. Correspondingly, the control device obtains the first network operation, to obtain the service intent.

Step 102: The control device obtains the mirror simulation network corresponding to the target network.

There are a plurality of methods for obtaining the mirror simulation network. This is not limited in this embodiment of this application. For example, if the mirror simulation network corresponding to the target network is stored in a database, the mirror simulation network may be directly obtained from the database.

Figure 6:
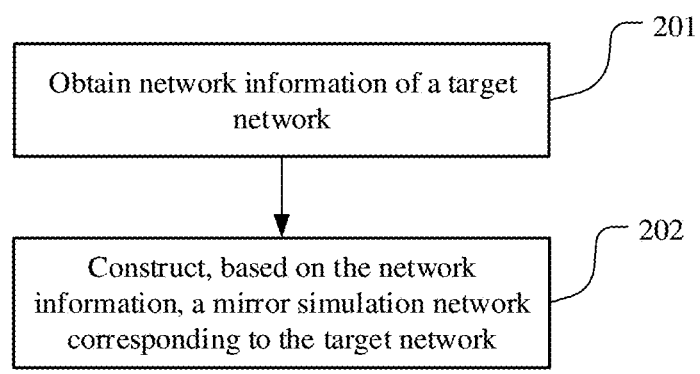
FIG. 6 is a schematic diagram of an embodiment of constructing a mirror simulation network according to an embodiment of this application.

As shown in FIG. 6, if the mirror simulation network is not stored in the database, in an implementable manner, obtaining the mirror simulation network corresponding to the target network may include the following steps.

Step 201: The control device obtains network information of the target network.

The network information may include a topology structure, configuration plane information, and forwarding plane information of the target network. The configuration plane information may include one or more of a link state, an interface state, interface bandwidth, an uplink rate, and a downlink rate. The forwarding plane information may include one or more of a Layer 2 forwarding table and a Layer 3 forwarding table.

Step 202: The control device constructs, based on the network information, the mirror simulation network corresponding to the target network.

Specifically, the mirror simulation network may be constructed based on a sandbox environment. Because a technology for constructing the mirror simulation network is mature, details are not described herein in this embodiment of this application.

Step 103: The control device determines verification content. The verification content is used to perform simulation verification on a running state of the mirror simulation network.

There may be a plurality of types of verification content. This is not specifically limited in this embodiment of this application. For example, the verification content may include: verifying whether a transmission path of a service flow in the target network is an optimal path, verifying whether transmission of the service flow in the target network meets security compliance, and verifying whether service information at a network device meets a requirement of the user.

There are also a plurality of methods for determining the verification content. This is not specifically limited in this embodiment of this application.

A process of determining the verification content is subsequently described in detail in this embodiment of this application with reference to FIG. 7.

Step 104: The control device performs the first network operation on the mirror simulation network based on the service intent.

In this embodiment of this application, the first network operation is performed on the mirror simulation network, to simulate performing the first network operation on the target network.

It is assumed that the first network operation is adjusting an access-control list of a network device. In this case, Step 104 may include: adjusting the access-control list of the network device in the mirror simulation network.

Step 105: The control device performs, after performing the first network operation on the mirror simulation network, simulation verification on the mirror simulation network based on the verification content, to obtain a first verification result. The first verification result is used to evaluate impact of the first network operation on the target network.

It should be noted that there are a plurality of methods for performing simulation verification on the mirror simulation network. This is not specifically limited in this embodiment of this application. For example, it is assumed that the first network operation is adjusting the access-control list of the network device. In this case, performing simulation verification on the mirror simulation network may include: simulating an access-control list algorithm of the network device by using a simulator or an algorithm, and then performing a test by using an original service flow on the network device.

Different verification content corresponds to different first verification results. There are a plurality of forms for the first verification result. This is not specifically limited in this embodiment of this application.

For example, it is assumed that the first network operation is adjusting the access-control list of the network device. In this case, the first verification result may include that, in the mirror simulation network, the network device allows a service flow to pass through, or the network device forbids a service flow to pass through. In addition, the first verification result may further include that, in the target network, the network device allows a service flow to pass through, or the network device forbids a service flow to pass through.

In this embodiment of this application, because the mirror simulation network can accurately reflect the target network, performing the first network operation on the mirror simulation network corresponding to the target network can better simulate performing the first network operation on the target network. Then, simulation verification is performed based on the verification content, to obtain the first verification result. In this way, the impact of the first network operation on the target network can be accurately evaluated based on the first verification result.

Based on the foregoing descriptions, it can be learned that there are a plurality of methods for determining the verification content. The following describes one of the methods. As shown in FIG. 7, determining the verification content includes the following steps.

Step 301: The control device determines a type of the verification content.

It should be noted that the type of the verification content may be defined based on an actual requirement. For example, the type of the verification content may include service information, an optimal path for data transmission, security compliance, and Internet of Things isolation.

The service information may be further classified into a plurality of types, for example, may be classified into flow service information and application service information.

There are a plurality of methods for determining the type of the verification content. This is not specifically limited in this embodiment of this application.

Figure 8:
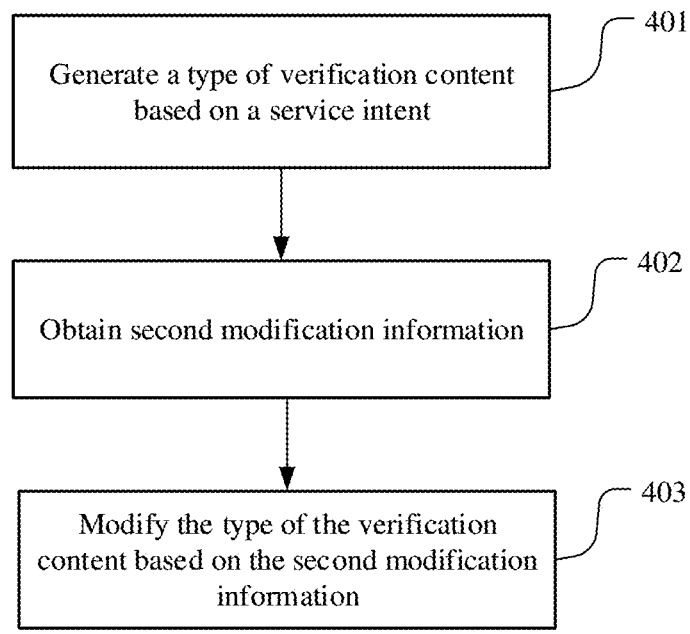
FIG. 8 is a schematic diagram of an embodiment of determining a type of verification content.

As shown in FIG. 8, for example, determining the type of the verification content includes the following steps.

Step 401: The control device generates the type of the verification content based on the service intent.

It may be understood that the type of the verification content is related to the service intent. Therefore, the type of the verification content may be automatically generated based on the service intent, to improve efficiency of determining the type of the verification content.

For example, if the service intent is the network change, the generated type of the verification content may include the service information, the optimal path for data transmission, and the security compliance.

If the service intent is the network optimization, the generated type of the verification content may include the service information and the security compliance.

It should be noted that, to implement flexible selection of the type of the verification content, based on the foregoing example, in another example, after the type of the verification content is generated based on the service intent, the method further includes the following steps.

Step 402: The control device obtains second modification information. The second modification information is used to indicate to modify the type of the verification content.

It may be understood that the second modification information may be input by the user. A form of the second modification information is not specifically limited in this embodiment of this application. For example, the second modification information may be a text or a voice, or may be a specific deletion instruction or an addition instruction.

Step 403: The control device modifies the type of the verification content based on the second modification information.

The following describes the foregoing process using a specific example. Specifically, the second interface shown in FIG. 5 is used as an example. It is assumed that the type of the verification content obtained after Step 401 is performed includes the service information and the security compliance. If the user needs to add the type of the verification content, namely, the optimal path for data transmission, the user may directly tap "+" in a dashed-line box on the interface shown in FIG. 5, and then select the "optimal path for data transmission" from "optional type of verification information". In this embodiment, the second modification information is an instruction for adding the optimal path for data transmission. If the user wants to delete the type of the verification content, namely, the security compliance, the user may directly tap a minus sign after the "security compliance" on the interface shown in FIG. 5. In this example, the second modification information is an instruction for deleting the security compliance.

Step 302: The control device obtains the verification content based on the type of the verification content.

It may be understood that the obtained verification content varies with the type of the verification content and a method for obtaining the verification content.

For example, if the type of the verification content is the optimal path for data transmission, the verification content may be verifying whether the transmission path of the service flow in the target network is an optimal path. If the type of the verification content is the security compliance, the verification content may be verifying whether the transmission of the service flow in the target network meets security compliance. If the type of the verification content is the Internet of Things isolation, the verification content may be verifying whether the target network meets a requirement of the Internet of Things isolation.

For example, if the type of the verification content is the service information, that the control device obtains the verification content based on the type of the verification content includes: the control device obtains, after performing the first network operation on the target network, a first service parameter that is of the target network in a running state and that is expected by the user.

The first service parameter of the target network in the running state includes a first service parameter of at least one network device in the target network.

The first service parameter may include a service flow parameter, and may specifically include a connectivity status of a service flow, a delay of the service flow, jitter of the service flow, and bandwidth of the service flow. Alternatively, the first service parameter may include an application parameter, and may specifically include a delay of an application, jitter of the application, and bandwidth of the application. It may be understood that the first service parameter may alternatively include both a service flow parameter and an application parameter.

The connectivity status of the service flow may be understood as that the network device allows some service flows to pass through and forbids other service flows to pass through.

It should be noted that there are a plurality of methods for obtaining the first service parameter. This is not specifically limited in this embodiment of this application. For example, the first service parameter may be directly generated based on the type of the verification content. The method may be used to obtain a first service parameter corresponding to an original network device of the target network, or may be used to obtain a first service parameter corresponding to a newly added network device.

Specifically, the target network shown in FIG. 2 is used as an example. Based on the target network shown in FIG. 1, the air purifier and the corresponding access device are added to the target network shown in FIG. 2. Therefore, a first service parameter corresponding to the access device may be directly generated. The first service parameter may include a connectivity status of a service flow, a delay of the service flow, jitter of the service flow, and bandwidth of the service flow. In this example, the connectivity status of the service flow may be understood as that the access device allows some service flows to pass through and forbids other service flows to pass through.

Figure 9:
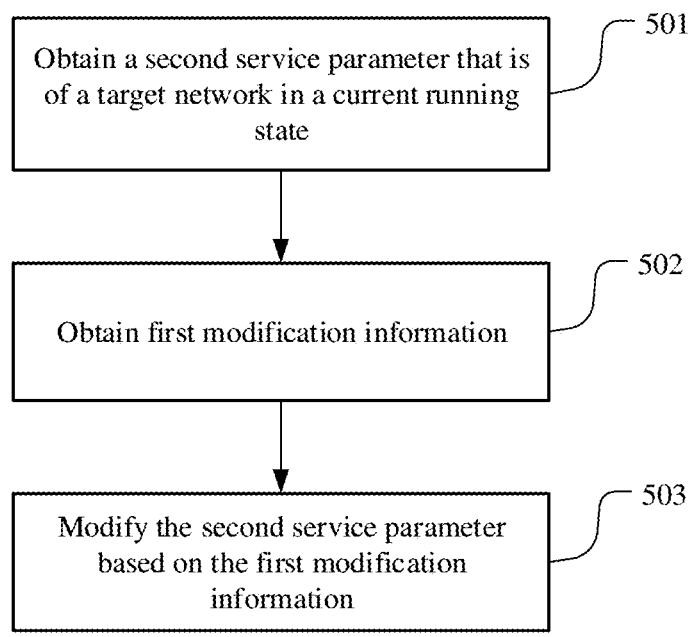
FIG. 9 is a schematic diagram of an embodiment of obtaining a first service parameter.

For the original network device of the target network, another method may be alternatively used to generate the first service parameter that is of the target network in a running state and that is expected by the user. Specifically, in another implementable manner, as shown in FIG. 9, obtaining, after the first network operation is performed on the target network, the first service parameter that is of the target network in the running state and that is expected by the user includes the following steps.

Step 501: The control device obtains a second service parameter that is of the target network in a current running state.

There are a plurality of methods for obtaining the second service parameter. This is not specifically limited in this embodiment of this application.

For example, if the second service parameter is a service flow parameter, a service flow, a transmission path of the service flow, and a QoS attribute corresponding to the service flow may be obtained based on a 5-tuple (namely, a source IP, a source port number, a transmission protocol, a destination IP, and a destination port number), and the quality of service QoS attribute may be used as the second service parameter. The second service parameter may specifically include a connectivity status of the service flow, a delay of the service flow, jitter of the service flow, and bandwidth of the service flow.

For another example, if the second service parameter is an application parameter, an application in the target network may be identified and a quality attribute of the application may be obtained. The quality attribute of the application may be used as the second service parameter. The second service parameter may specifically include a delay of the application, jitter of the application, and bandwidth of the application.

Step 502: The control device obtains first modification information. The first modification information is used to indicate to modify the second service parameter.

Similar to the second modification information, the first modification information may also be input by the user. In addition, a form of the first modification information is not specifically limited in this embodiment of this application. For example, the first modification information may be a text (which includes a digit), a voice, or another form.

Step 503: The control device modifies the second service parameter based on the first modification information, and uses a modified second service parameter as the first service parameter that is of the target network in the running state and that is expected by the user.

Figure 10:
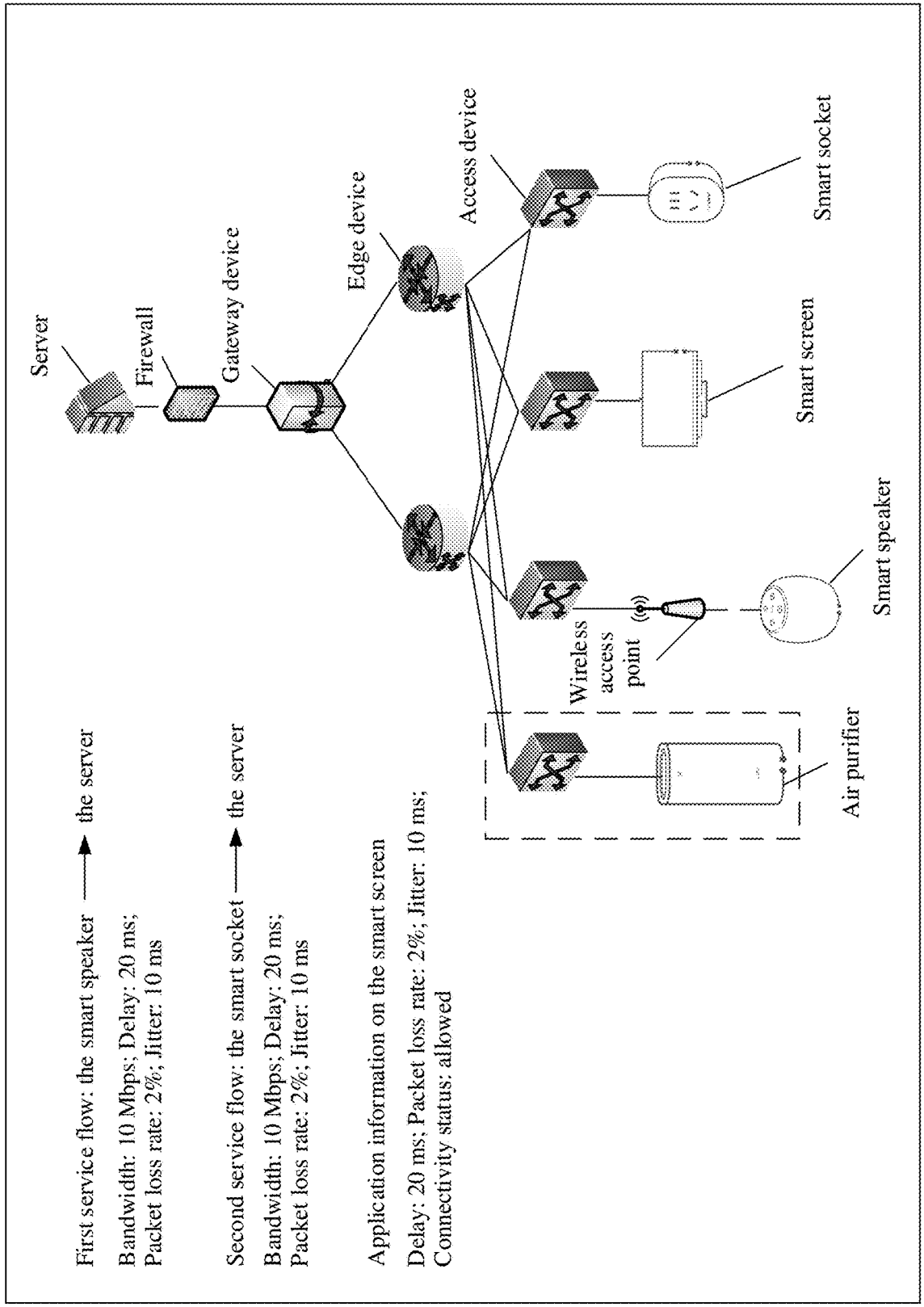
FIG. 10 is a schematic diagram of an embodiment of a third interface according to an embodiment of this application.

The following describes the foregoing process by using a specific example. FIG. 10 is a schematic diagram of an embodiment of a third interface according to an embodiment of this application. As shown in FIG. 10, the third interface includes a mirror simulation network of the target network, and the first network operation is performed on the mirror simulation network.

In this example, to obtain a first service parameter of a gateway device, a second service parameter of the gateway device is first obtained. The second service parameter includes a first service flow parameter, a second service flow parameter, and an application parameter. Specifically, the first service flow parameter refers to information about a service flow from a smart speaker to a server, and specifically includes bandwidth, a delay, a packet loss rate, and jitter. The second service flow parameter refers to information about a service flow from a smart socket to the server, and specifically includes bandwidth, a delay, a packet loss rate, and jitter. The application parameter refers to an application parameter on a smart screen, and specifically includes a delay, a packet loss rate, jitter, and a connectivity status.

On the third interface, the user may directly modify the second service parameter on the third interface. For example, the user may modify the delay 20 ms in the first service flow parameter to 22 ms.

In this embodiment of this application, the second service parameter that is of the target network in the current running state may be first obtained, and then the second service parameter is modified based on the first modification information input by the user, to obtain the first service parameter. Compared with that in a manner in which the user manually sets each piece of information of the service information one by one, in this embodiment of this application, efficiency of obtaining the first service parameter can be improved.

Based on the foregoing two embodiments of obtaining the first service parameter, in another embodiment of the method for evaluating impact of a network operation provided in this embodiment of this application, that the control device performs, after performing the first network operation on the mirror simulation network, simulation verification on the mirror simulation network based on the verification content, to obtain a first verification result includes: first, the control device obtains, after performing the first network operation on the mirror simulation network, a third service parameter that is of the mirror simulation network in the running state.

It should be noted that there are a plurality of methods for obtaining the third service parameter. This is not specifically limited in this embodiment of this application. Specifically, a method for obtaining the third service parameter may be related to the service intent.

In an implementable manner, if the service intent is used to indicate to add a first network device to the target network, that the control device obtains, after performing the first network operation on the mirror simulation network, a third service parameter that is of the mirror simulation network in the running state includes: the control device obtains, after the first network device is added to the mirror simulation network, a third service parameter that is of the first network device in a running state.

Correspondingly, the verification content includes verifying whether the third service parameter of the first network device meets a requirement of the first service parameter.

In another implementable manner, if the service intent is used to indicate to adjust an access-control list of a second network device in the target network, that the control device obtains, after performing the first network operation on the mirror simulation network, a third service parameter that is of the mirror simulation network in the running state includes: the control device obtains, after the access-control list of the second network device in the target network is adjusted, a service flow that passes through the second network device.

Correspondingly, the verification content includes verifying whether the service flow that passes through the second network device meets a requirement of the access-control list.

After obtaining the third service parameter, the control device generates a first comparison result between the first service parameter and the third service parameter.

Figure 11:
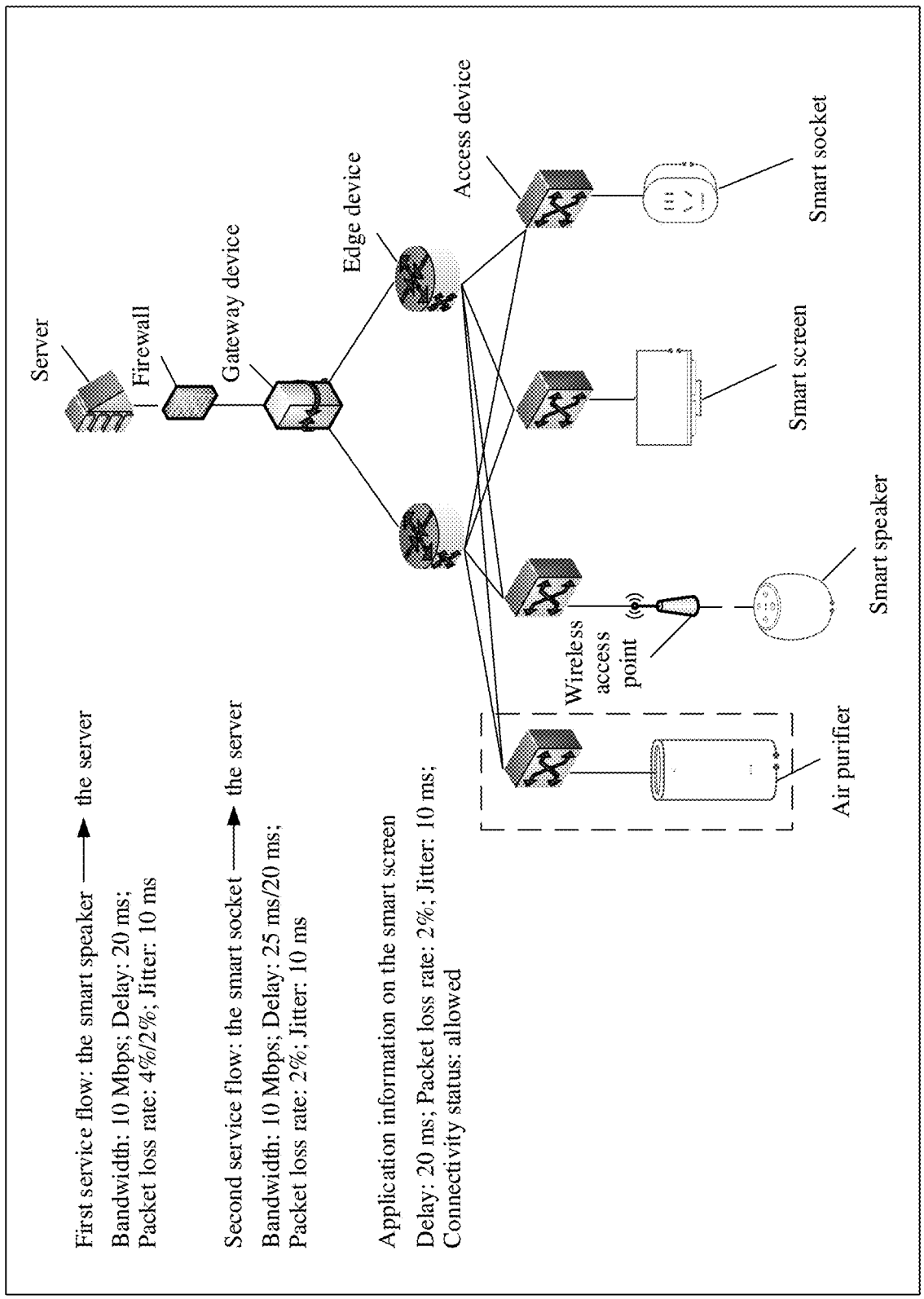
FIG. 11 is a schematic diagram of an embodiment of a fourth interface according to an embodiment of this application.

There are a plurality of forms for the first comparison result. This is not specifically limited in this embodiment of this application. The first comparison result may include a comparison result between the first service parameter and the third service parameter. To display the comparison result more intuitively, the first service parameter and the third service parameter may be separately displayed in fonts of different colors. For example, FIG. 11 is a schematic diagram of an embodiment of a fourth interface according to an embodiment of this application. It is assumed that a first service parameter in FIG. 11 is the second service parameter in FIG. 10. It can be learned, by comparing FIG. 10 with FIG. 11, that FIG. 11 shows a comparison result that the third service parameter does not meet the requirement of the first service parameter. Specifically, for the first service flow parameter, FIG. 11 shows a packet loss rate of 2% in the first service parameter and a packet loss rate of 4% in the third service parameter. For the second service flow parameter, FIG. 11 shows a delay of 20 ms in the second service parameter and a delay of 25 ms in the third service parameter.

In another implementable manner, the first comparison result may alternatively include a difference between the first service parameter and the third service parameter. Specifically, if the difference is positive, it indicates that a value in the first service parameter is greater than a value in the third service parameter. If the difference is negative, it indicates that a value in the first service parameter is less than a value in the third service parameter.

Based on the foregoing descriptions, it can be learned that there are a plurality of methods for obtaining the mirror simulation network by the control device. In an implementable manner, that the control device obtains the mirror simulation network corresponding to the target network includes: the control device first obtains network information of the target network.

The network information may include a topology structure, configuration plane information, and forwarding plane information of the target network. The configuration plane information may include one or more of a link state, an interface state, interface bandwidth, an uplink rate, and a downlink rate. The forwarding plane information may include one or more of a Layer 2 forwarding table and a Layer 3 forwarding table.

Then, the control device constructs, based on the network information, the mirror simulation network corresponding to the target network.

It should be noted that a technology for constructing the mirror simulation network is mature, and therefore details are not described herein.

Based on the foregoing descriptions, it can be learned that the impact of the first network operation on the target network may be evaluated based on the first verification result. When the impact of the first network operation on the target network is low or null, corresponding configuration may be performed on the target network, to implement the first network operation on the target network. When the impact of the first network operation on the target network is high, corresponding adjustment may be performed, to reduce the impact of the first network operation on the target network on the premise that the first network operation on the target network is implemented.

Specifically, based on the foregoing embodiments, as shown in FIG. 3, this embodiment of this application further provides an embodiment of the method for evaluating impact of a network operation. In this embodiment, the method further includes the following step.

Step 106: The control device sends first configuration information to the target network based on the fact that the first verification result meets a preset requirement.

It should be noted that, it may be determined, in a plurality of manners, that the first verification result meets the preset requirement. For example, when the verification content is verifying whether the transmission path of the service flow in the target network is the optimal path, if the first verification result shows that the transmission path of the service flow in the target network is the optimal path, it indicates that the first verification result meets the preset requirement. When the verification content is verifying whether the transmission of the service flow in the target network meets the security compliance, if the first verification result shows that the transmission of the service flow in the target network meets the security compliance, it indicates that the first verification result meets the preset requirement. When the verification content is verifying whether the target network meets the Internet of Things isolation requirement, if the first verification result shows that the target network meets the requirement of the Internet of Things isolation, it indicates that the first verification result meets the preset requirement.

For another example, when the verification content is the first service parameter that is of the target network in the running state and that is expected by the user, if the first verification result shows that the third service parameter meets the requirement of the first service parameter, it indicates that the first verification result meets the preset requirement.

The first configuration information is used to indicate the target network to perform configuration related to the first network operation. Specifically, the first configuration information is used to indicate one or more network devices in the target network to perform configuration related to the first network operation. It should be noted that different first network operations correspond to different first configuration information.

The target network shown in FIG. 2 is used as an example. It is assumed that the first network operation is adding the air purifier and the access device corresponding to the air purifier. In this case, the first configuration information may include configuration information of the newly added access device, configuration information of an edge device corresponding to the newly added access device, configuration information of a gateway device corresponding to the edge device, and the like. The newly added access device is used as an example. The configuration information may include a QoS parameter of the newly added access device, an access-control list of the newly added access device, and the like.

For another example, if the first network operation is adjusting an access-control list of an access device corresponding to the smart screen in FIG. 2, the first configuration information may include only a new access-control list of the access device corresponding to the smart screen.

The foregoing embodiment describes a case in which the first verification result meets the preset requirement. The following describes a case in which the first verification result does not meet a preset requirement.

Specifically, based on the foregoing embodiments, as shown in FIG. 3, this embodiment of this application further provides an embodiment of the method for evaluating impact of a network operation. In this embodiment, the method further includes the following steps.

Step 107: The control device generates a first network operation solution based on the fact that the first verification result does not meet the preset requirement. The first network operation solution is used to indicate to continue to perform a second network operation on the mirror simulation network, so that a second verification result obtained by performing simulation verification on the mirror simulation network based on the verification content meets the preset requirement.

It should be noted that there are a plurality of methods for generating the first network operation solution. This is not specifically limited in this embodiment of this application. For example, the first network operation solution may be generated based on a technology, for example, an expert experience library or knowledge graph.

There may be a plurality of types of content of the first network operation solution, and the content is specifically related to the first verification result. The mirror simulation network shown in FIG. 11 is used as an example. For a second service flow parameter of the gateway device, the first verification result in FIG. 11 shows that the delay that is in the first service parameter and that is expected by the user is 20 ms. However, the delay in the third service parameter of the mirror simulation network in the running state is 25 ms. To be specific, the first verification result does not meet the preset requirement.

Based on this, a network operation solution may be generated. The first network operation solution is used to indicate to add a link between the gateway device and an edge device corresponding to the smart socket, to reduce a delay of the second service flow.

Based on the foregoing embodiment, to verify that the generated first network operation solution can enable the second verification result obtained by performing simulation verification on the mirror simulation network based on the verification content to meet the preset requirement, as shown in FIG. 3, this embodiment of this application further provides an embodiment of the method for evaluating impact of a network operation. In this embodiment, after the first network operation solution is generated based on the fact that the first verification result does not meet the preset requirement, the method further includes the following steps.

Step 108: The control device performs the second network operation on the mirror simulation network based on the first network operation solution.

The second network operation performed on the mirror simulation network is similar to the first network operation performed on the mirror simulation network. For details, refer to the foregoing related descriptions to understand Step 108.

The foregoing example is used as an example. Performing the second network operation on the mirror simulation network based on the first network operation solution may include: adding a link between a gateway device in the mirror simulation network and an edge device corresponding to the smart socket.

Step 109: The control device performs, after performing the second network operation on the mirror simulation network, simulation verification on the mirror simulation network based on the verification content, to obtain the second verification result.

The second verification result is similar to the first verification result. For details, refer to the foregoing related descriptions of the first verification result to understand the second verification result. The second verification result may meet the preset requirement, or may not meet the preset requirement.

The foregoing example is used as an example. After the link is added between the gateway device in the mirror simulation network and the edge device corresponding to the smart socket, the second verification result may show that the delay in the third service parameter of the mirror simulation network in the running state changes to 20 ms, that is, the second verification result meets the preset requirement.

The following describes a case in which the second verification result meets the preset requirement.

This embodiment of this application further provides an embodiment of the method for evaluating impact of a network operation. In this embodiment. The method further includes the following step.

Step 110: The control device sends second configuration information to the target network based on the fact that the second verification result meets the preset requirement. The second configuration information is used to indicate the target network to perform configuration related to the first network operation and configuration related to the second network operation.

The second configuration information is similar to the first configuration information. For details, refer to the foregoing related descriptions of the first configuration information to understand the second configuration information.

A difference lies in that the second configuration information indicates not only the target network to perform configuration related to the first network operation, but also the target network to perform configuration related to the second network operation.

For example, in the foregoing example, performing the second network operation on the mirror simulation network based on the first network operation solution includes: adding the link between the gateway device in the mirror simulation network and the edge device corresponding to the smart socket. In this case, the second configuration information indicates a gateway device in the target network and an edge device corresponding to the smart socket to perform corresponding configuration, to establish a new link. It can be learned from the foregoing embodiment that the first configuration information is sent to the target network when the first verification result meets the preset requirement, to perform the first network operation on the target network; and the second configuration information is sent to the target network when the second verification result meets the preset requirement, to perform the second network operation on the target network. To further determine that the impact of the first network operation on the target network, or impact of the first network operation and the second network operation on the target network can meet the requirement of the user, this embodiment of this application further provides an embodiment of the method for evaluating impact of a network operation, the method further includes the following steps.

Step 111: The control device sends a packet to the target network. The packet is used to indicate the target network to perform a dialing test.

It should be noted that the dialing test means that an actual test is performed on the target network. For example, it is assumed that the first network operation is adjusting an access-control list of the gateway device. In this case, the target network selects a corresponding service flow for testing. Specifically, the target network shown in FIG. 2 is used as an example, a dialing test process may include: The smart speaker and the smart screen separately sends a service flow to the server, to test whether the two service flows can pass through the gateway device, and a dialing test result is determined with reference to the access-control list.

Step 112: The control device obtains the dialing test result, to determine that the dialing test result meets the preset requirement.

In this embodiment of this application, the packet is used to indicate the target network to perform the dialing test, and the dialing test result is used to determine that the impact of the first network operation on the target network can meet the requirement of the user, or determine that the impact of the first network operation and the second network operation on the target network can meet the requirement of the user.

Based on the foregoing descriptions, it can be learned that, based on the fact that the first verification result does not meet the preset requirement, the control device generates the first network operation solution, performs the second network operation on the mirror simulation network based on the first network operation solution, and then performs verification again, to obtain the second verification result. However, there is a situation that the second verification result also does not meet the preset requirement. Therefore, the first network operation solution cannot enable the running state of the target network to meet the requirement of the user.

Figure 12:
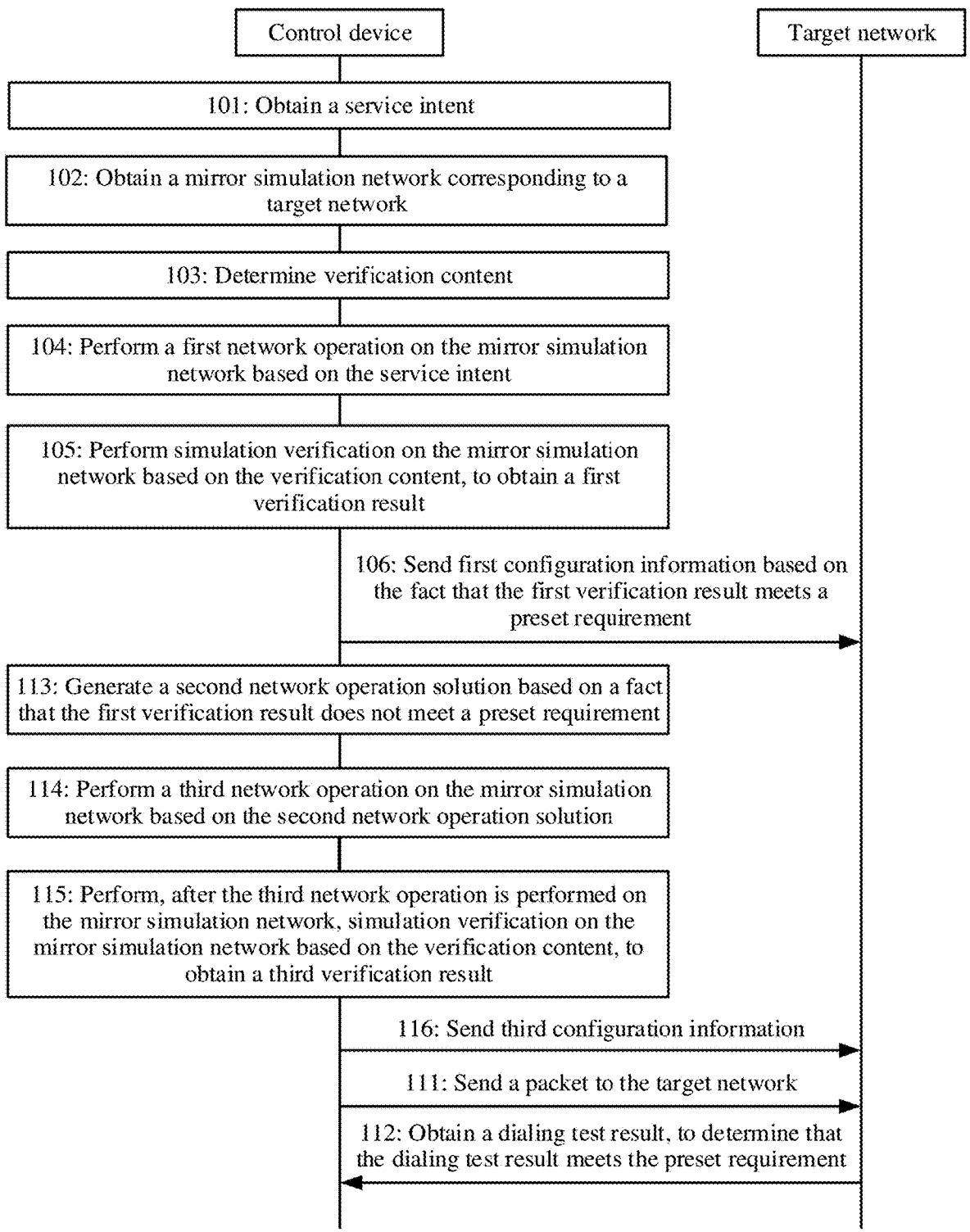
FIG. 12 is a schematic diagram of a second embodiment of a method for evaluating impact of a network operation according to an embodiment of this application.

Therefore, as shown in FIG. 12, in another embodiment of the method for evaluating impact of a network operation provided in this embodiment of this application, based on the fact that the first verification result does not meet a preset requirement, the method further includes the following steps.

Step 113: The control device generates a second network operation solution. The second network operation solution is used to indicate to perform a third network operation on the mirror simulation network.

That the control device generates the second network operation solution is similar to that the control device generates the first network operation solution. For details, refer to the foregoing related descriptions for understanding.

Step 114: The control device performs the third network operation on the mirror simulation network based on the second network operation solution.

Performing the third network operation on the mirror simulation network is similar to performing the first network operation on the mirror simulation network. For details, refer to the foregoing related descriptions for understanding.

Step 115: The control device performs, after performing the third network operation on the mirror simulation network, simulation verification on the mirror simulation network based on the verification content, to obtain a third verification result.

In this embodiment of this application, a process of performing simulation verification on the mirror simulation network to obtain the third verification result is similar to a process of performing simulation verification on the mirror simulation network to obtain the second verification result in the foregoing embodiment. For details, refer to related descriptions in the foregoing embodiment for understanding.

The control device repeatedly performs the foregoing steps until the third verification result meets the preset requirement.

Different from that in the foregoing embodiment, in this embodiment of this application, Step 113 to Step 115 are performed for a plurality of times until the third verification result meets the preset requirement.

For example, the control device first performs Step 113 to Step 115 once. If the obtained third verification result does not meet the preset requirement, the control device performs Step 113 to Step 115 again. If a third verification result obtained by performing Step 113 to Step 115 again does not meet the preset requirement, the control device performs Step 113 to Step 115 for a third time. A subsequent process is similar to the foregoing process until an obtained third verification result meets the preset requirement.

It should be noted that second network operation solutions generated each time Step 113 to Step 115 are performed are different. Specifically, when performing Step 113 for the first time, the control device generates a second network operation solution. Based on the fact that a third verification result corresponding to the second network operation solution does not meet the preset requirement, the control device performs Step 113 for the second time, to generate another second network operation solution.

Step 116: The control device sends third configuration information to the target network. The third configuration information is used to indicate the target network to perform configuration related to the first network operation and configuration related to the third network operation.

It should be noted that a process in which the control device sends the third configuration information is similar to a process in which the control device sends the second configuration information. For details, refer to related descriptions in the foregoing embodiment for understanding.

After Step 116 is performed, the control device may also perform Step 111 and Step 112, to perform a dialing test. For details, refer to related descriptions of Step 111 and Step 112 for understanding.

Figure 13:
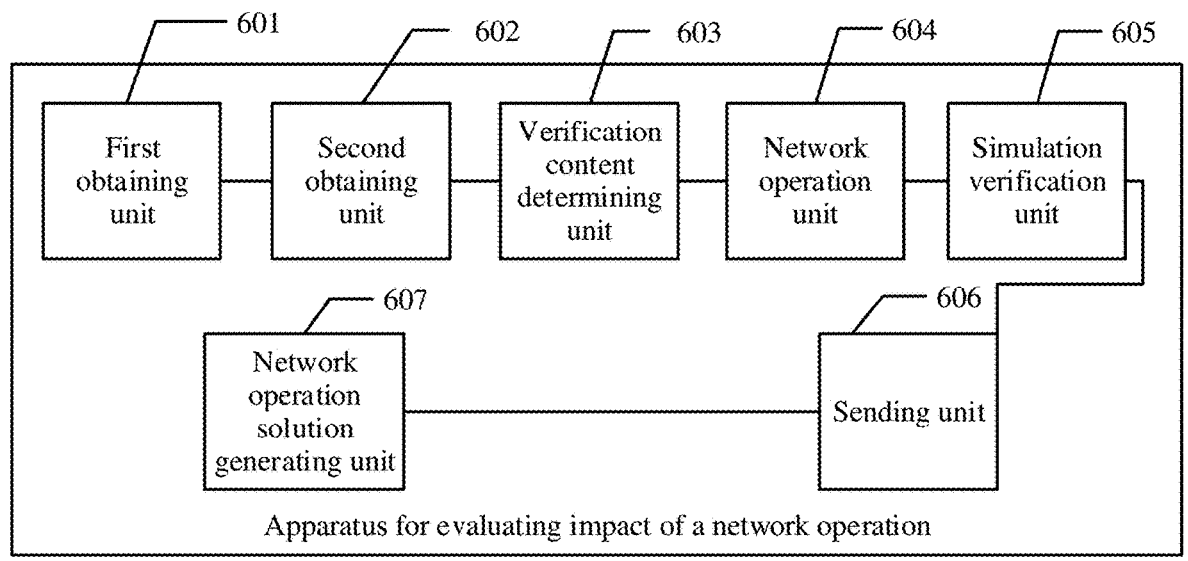
FIG. 13 is a schematic diagram of a structure of an apparatus for evaluating impact of a network operation according to an embodiment of this application.

FIG. 13 shows an embodiment of an apparatus for evaluating impact of a network operation according to an embodiment of this application. The apparatus includes: a first obtaining unit 601, configured to obtain a service intent, where the service intent is used to indicate to perform a first network operation on a target network; a second obtaining unit 602, configured to obtain a mirror simulation network corresponding to the target network; a verification content determining unit 603, configured to determine verification content, where the verification content is used to perform simulation verification on a running state of the mirror simulation network; a network operation unit 604, configured to perform the first network operation on the mirror simulation network based on the service intent; and a simulation verification unit 605, configured to perform, after the first network operation is performed on the mirror simulation network, simulation verification on the mirror simulation network based on the verification content, to obtain a first verification result, where the first verification result is used to evaluate impact of the first network operation on the target network.

It should be noted that functions of the first obtaining unit 601, the second obtaining unit 602, the verification content determining unit 603, the network operation unit 604, and the simulation verification unit 605 may be understood with reference to related descriptions of Step 101 to Step 105 in FIG. 3.

In another embodiment of the apparatus for evaluating the impact of the network operation provided in this embodiment of this application, the verification content determining unit 603 is configured to: determine a type of the verification content; and obtain the verification content based on the type of the verification content.

In another embodiment of the apparatus for evaluating the impact of the network operation provided in this embodiment of this application, the type of the verification content is service information.

The verification content determining unit 603 is configured to: obtain, after the first network operation is performed on the target network, a first service parameter that is of the target network in a running state and that is expected by a user.

Figure 7:
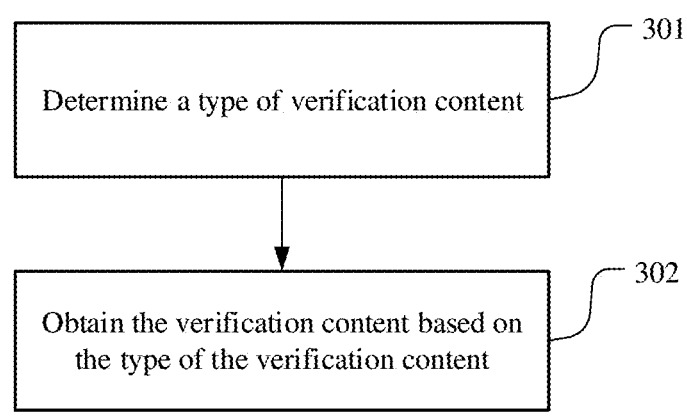
FIG. 7 is a schematic diagram of an embodiment of determining verification content.

It should be noted that the function of the verification content determining unit 603 may be understood with reference to related descriptions of Step 301 to Step 302 in FIG. 7.

In another embodiment of the apparatus for evaluating the impact of the network operation provided in this embodiment of this application, the verification content determining unit 603 is configured to: obtain a second service parameter that is of the target network in a current running state; obtain first modification information, where the first modification information is used to indicate to modify the second service parameter; and modify the second service parameter based on the first modification information, and use a modified second service parameter as the first service parameter that is of the target network in the running state and that is expected by the user.

It should be noted that the function of the verification content determining unit 603 may be understood with reference to related descriptions of Step 501 to Step 503 in FIG. 9.

In another embodiment of the apparatus for evaluating the impact of the network operation provided in this embodiment of this application, the simulation verification unit 605 is configured to: obtain, after performing the first network operation on the mirror simulation network, a third service parameter that is of the mirror simulation network in the running state in a sandbox environment; and generate a first comparison result between the first service parameter and the third service parameter.

It should be noted that the function of the simulation verification unit 605 may be understood with reference to related descriptions of corresponding steps in the foregoing embodiment.

In another embodiment of the apparatus for evaluating the impact of the network operation provided in this embodiment of this application, the service intent is used to indicate to add a first network device to the target network.

The simulation verification unit 605 is configured to obtain, after the first network device is added to the mirror simulation network, a third service parameter that is of the first network device in a running state.

It should be noted that the function of the simulation verification unit 605 may be understood with reference to related descriptions of corresponding steps in the foregoing embodiment.

In another embodiment of the apparatus for evaluating the impact of the network operation provided in this embodiment of this application, the service intent is used to indicate to adjust an access-control list of a second network device in the target network.

The simulation verification unit 605 is configured to obtain, after the access-control list of the second network device in the target network is adjusted, a service flow that passes through the second network device.

It should be noted that the function of the simulation verification unit 605 may be understood with reference to related descriptions of corresponding steps in the foregoing embodiment.

In another embodiment of the apparatus for evaluating the impact of the network operation provided in this embodiment of this application, the verification content determining unit 603 is configured to generate the verification content based on the service intent.

It should be noted that the function of the verification content determining unit 603 may be understood with reference to related descriptions of Step 401 in FIG. 8.

In another embodiment of the apparatus for evaluating the impact of the network operation provided in this embodiment of this application, the verification content determining unit 603 is further configured to: obtain second modification information, where the second modification information is used to indicate to modify the verification content; and modify the verification content based on the second modification information.

It should be noted that the function of the verification content determining unit 603 may be understood with reference to related descriptions of Step 402 to Step 403 in FIG. 8.

In another embodiment of the apparatus for evaluating the impact of the network operation provided in this embodiment of this application, the second obtaining unit 602 is configured to: obtain network information of the target network; and construct, based on the network information, the mirror simulation network corresponding to the target network.

It should be noted that the function of the second obtaining unit 602 may be understood with reference to related descriptions of Step 201 to Step 202 in FIG. 6.

In another embodiment of the apparatus for evaluating the impact of the network operation provided in this embodiment of this application, the apparatus further includes: a sending unit 606, configured to send first configuration information to the target network based on the fact that the first verification result meets a preset requirement. The first configuration information is used to indicate the target network to perform configuration related to the first network operation.

It should be noted that a function of the sending unit 606 may be understood with reference to related descriptions of Step 106 in FIG. 3.

In another embodiment of the apparatus for evaluating the impact of the network operation provided in this embodiment of this application, the apparatus further includes: a network operation solution generating unit 607, configured to generate a first network operation solution based on the fact that the first verification result does not meet a preset requirement. The first network operation solution is used to indicate to continue to perform a second network operation on the mirror simulation network, so that a second verification result obtained by performing simulation verification on the mirror simulation network based on the verification content meets the preset requirement.

It should be noted that a function of the network operation solution generating unit 607 may be understood with reference to related descriptions of Step 107 in FIG. 3.

In another embodiment of the apparatus for evaluating the impact of the network operation provided in this embodiment of this application, the simulation verification unit 605 is further configured to: perform the second network operation on the mirror simulation network based on the first network operation solution; and perform, after the second network operation is performed on the mirror simulation network, simulation verification on the mirror simulation network based on the verification content, to obtain the second verification result.

It should be noted that the function of the simulation verification unit 605 may be understood with reference to related descriptions of Step 108 to Step 109 in FIG. 3.

In another embodiment of the apparatus for evaluating the impact of the network operation provided in this embodiment of this application, the sending unit 606 is further configured to send second configuration information to the target network based on the fact that the second verification result meets the preset requirement. The second configuration information is used to indicate the target network to perform configuration related to the first network operation and configuration related to the second network operation.

It should be noted that a function of the sending unit 606 may be understood with reference to related descriptions of Step 110 in FIG. 3.

In another embodiment of the apparatus for evaluating the impact of the network operation provided in this embodiment of this application, the apparatus further includes a network operation solution generating unit 607 and a sending unit 606.

The network operation solution generating unit 607 is configured to generate a second network operation solution. The second operation solution is used to indicate to perform a third network operation on the mirror simulation network.

The simulation verification unit 605 is further configured to: perform the third network operation on the mirror simulation network based on the second network operation solution; and perform, after the third network operation is performed on the mirror simulation network, simulation verification on the mirror simulation network based on the verification content, to obtain a third verification result.

The sending unit 606 is configured to send third configuration information to the target network. The third configuration information is used to indicate the target network to perform configuration related to the first network operation and configuration related to the third network operation.

It should be noted that the network operation solution generating unit 607 may be understood with reference to related descriptions of Step 113 in FIG. 12.

The function of the simulation verification unit 605 may be understood with reference to related descriptions of Step 114 and Step 115 in FIG. 12.

A function of the sending unit 606 may be understood with reference to related descriptions of Step 116 in FIG. 12.

In another embodiment of the apparatus for evaluating the impact of the network operation provided in this embodiment of this application, the sending unit 606 is further configured to send a packet to the target network. The packet is used to indicate the target network to perform a dialing test.

It should be noted that the function of the sending unit 606 may be understood with reference to related descriptions of Step 111 in FIG. 3.

The first obtaining unit 601 is further configured to obtain a dialing test result, to determine that the dialing test result meets the preset requirement.

It should be noted that the function of the first obtaining unit 601 may be understood with reference to related descriptions of Step 112 in FIG. 3.

Figure 14:
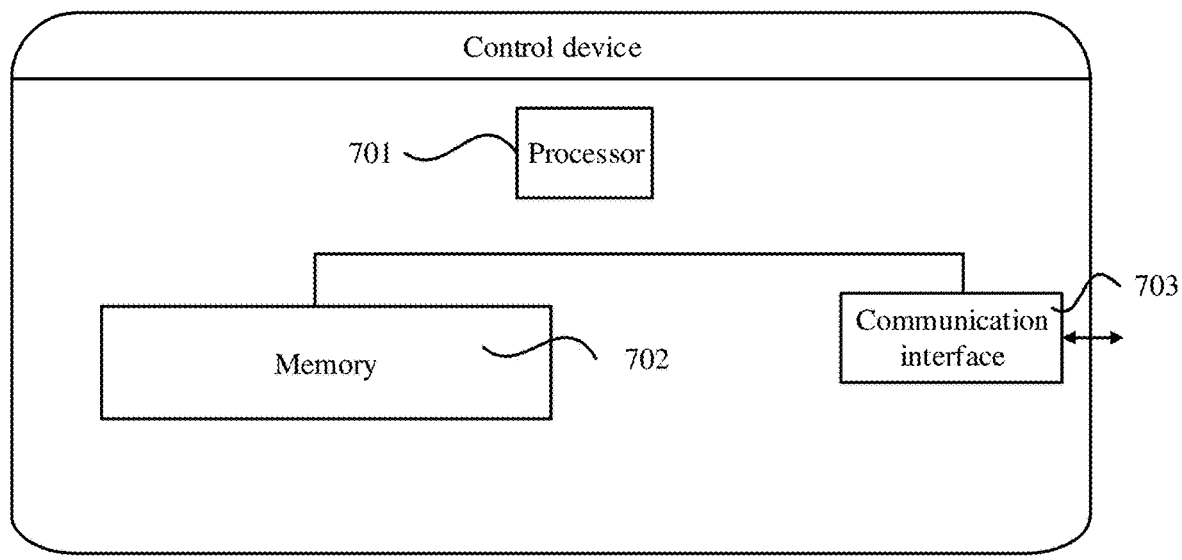
FIG. 14 is a schematic diagram of a structure of a control device according to an embodiment of this application.

Refer to FIG. 14. An embodiment of a control device according to an embodiment of this application may include one or more processors 701, a memory 702, and a communication interface 703.

The memory 702 may perform ephemeral storage or durable storage. Further, the processor 701 may be configured to communicate with the memory 702, and perform, on the control device, operations of a series of instructions in the memory 702.

In this embodiment, the processor 701 may perform the operations performed by the control device in the embodiments shown in FIG. 3, FIG. 6 to FIG. 9, and FIG. 12. Details are not described herein again.

Specifically, the processor 701 may perform the following steps: obtaining a service intent, where the service intent is used to indicate to perform a first network operation on a target network; obtaining a mirror simulation network corresponding to the target network; determining verification content, where the verification content is used to perform simulation verification on a running state of the mirror simulation network; performing the first network operation on the mirror simulation network based on the service intent; and performing, after the first network operation is performed on the mirror simulation network, simulation verification on the mirror simulation network based on the verification content, to obtain a first verification result, where the first verification result is used to evaluate impact of the first network operation on the target network.

In this embodiment, specific function module division in the processor 701 may be similar to the function module division manner described in FIG. 12. Details are not described herein again. An embodiment of this application further provides a chip or a chip system. The chip or the chip system includes at least one processor and a communication interface. The communication interface is interconnected to the at least one processor through a line. The at least one processor is configured to run a computer program or instructions, to perform the operations performed by the control device in the embodiments shown in FIG. 3, FIG. 6 to FIG. 9, and FIG. 12. Details are not described herein again.

The communication interface in the chip may be an input/output interface, a pin, a circuit, or the like.

An embodiment of this application further provides a first implementation of a chip or a chip system. The chip or the chip system described above in this application further includes at least one memory. The at least one memory stores instructions. The memory may be a storage unit inside the chip, for example, a register or a buffer, or may be a storage unit (for example, a read-only memory or a random access memory) of the chip.

An embodiment of this application further provides a computer storage medium. The computer storage medium is configured to store computer software instructions used by the foregoing control device. The computer software instructions are used to execute a program designed for a terminal device.

The terminal device may be the foregoing apparatus for evaluating the impact of the network operation described in FIG. 13.

An embodiment of this application further provides a computer program product. The computer program product includes computer software instructions. The computer software instructions may be loaded by a processor to implement the procedure in the method for evaluating impact of a network operation according to any one of FIG. 3, FIG. 6 to FIG. 9, and FIG. 12.

Figure 15:
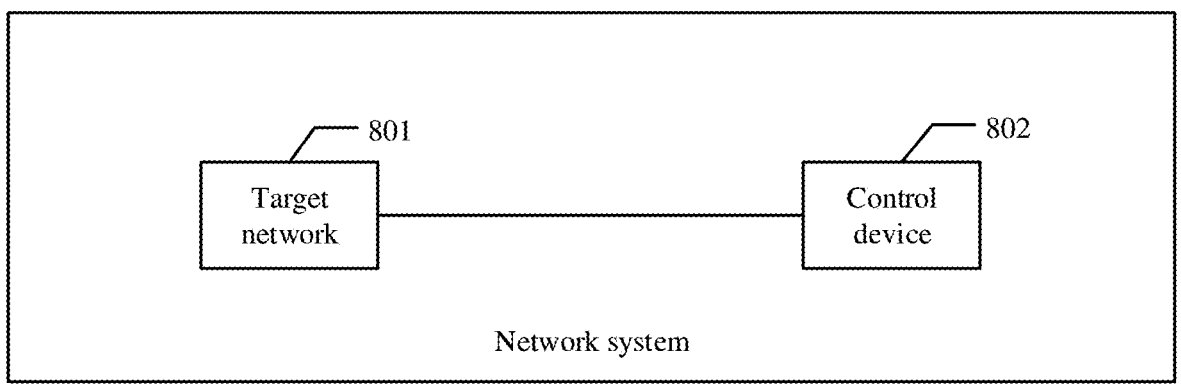
FIG. 15 is a schematic diagram of a structure of a network system according to an embodiment of this application.

Refer to FIG. 15. An embodiment of this application further provides a network system. The network system includes a target network 801 and a control device 802. The target network 801 includes one or more network devices.

The control device 802 is configured to perform the method for evaluating impact of a network operation according to any one of FIG. 3, FIG. 6 to FIG. 9, and FIG. 12.

For example, after receiving first configuration information, the target network 801 performs configuration related to a first network operation.

For example, after receiving second configuration information, the target network 801 performs configuration related to a first network operation and configuration related to a second network operation.

For example, after receiving third configuration information, the target network 801 performs configuration related to a first network operation and configuration related to a third network operation.

It may be clearly understood by a person skilled in the art that, for the purpose of convenient and brief description, for a detailed working process of the foregoing systems, apparatuses, and units, refer to a corresponding process in the foregoing method embodiments. Details are not described herein again.

In the several embodiments provided in this application, it should be understood that the disclosed systems, apparatuses, and methods may be implemented in other manners. For example, the foregoing described apparatus embodiments are merely examples. For example, division of the units is merely a logical function division and may be another division during actual implementation. For example, a plurality of units or components may be combined or integrated into another system, or some features may be ignored or may not be performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate components may or may not be physically separate, and components displayed as units may or may not be physical units. To be specific, the components may be located at one location, or may be distributed on a plurality of network units. Some or all of the units may be selected based on actual requirements to achieve the objectives of the solutions in embodiments.

In addition, functional units in embodiments of this application may be integrated into one processing unit, each of the units may exist alone physically, or two or more units are integrated into one unit. The foregoing integrated unit may be implemented in a form of hardware, or may be implemented in a form of a software functional unit. When being implemented in the form of the software functional unit and sold or used as an independent product, the integrated unit may be stored in a computer-readable storage medium. Based on such an understanding, the technical solutions of this application essentially, or the part contributing to the conventional technology, or all or some of the technical solutions may be implemented in a form of a software product. The computer software product is stored in a storage medium, and includes a plurality of instructions for instructing a computer device (which may be, for example, a personal computer, a server, or a network device) to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

What is claimed is:

1. A method, comprising:
obtaining, by a control device, a service intent, wherein the service intent indicates to perform a first network operation on a target network, and the service intent indicates to adjust an access-control list of a second network device in the target network;
obtaining, by the control device, a mirror simulation network corresponding to the target network;
determining, by the control device, verification content, wherein the verification content is used to perform simulation verification on a running state of the mirror simulation network, the verification content comprises service information, and determining the verification content comprises:
obtaining, by the control device, a first service parameter that is of the target network in a running state, wherein the first service parameter is based on information obtained from performing the first network operation on the target network;
performing, by the control device, the first network operation on the mirror simulation network based on the service intent; and
performing, by the control device after performing the first network operation on the mirror simulation network, simulation verification on the mirror simulation network based on the verification content, to obtain a first verification result comprising obtaining, by the control device after the access-control list of the second network device in the target network is adjusted, a service flow that passes through the second network device, wherein the first verification result is used to evaluate impact of the first network operation on the target network.

2. The method according to claim 1, wherein determining, by the control device, the verification content further comprises:
determining, by the control device, a type of the verification content; and
obtaining, by the control device, the verification content based on the type of the verification content.

3. The method according to claim 1, wherein obtaining, by the control device after performing the first network operation on the target network, the first service parameter that is of the target network in the running state comprises:
obtaining, by the control device, a second service parameter that is of the target network in a current running state;
obtaining, by the control device, first modification information, wherein the first modification information indicates to modify the second service parameter; and
modifying, by the control device, the second service parameter based on the first modification information, to obtain a modified second service parameter, and using the modified second service parameter as the first service parameter that is of the target network in the running state.

4. The method according to claim 1, wherein performing, by the control device after performing the first network operation on the mirror simulation network, the simulation verification on the mirror simulation network based on the verification content, to obtain the first verification result comprises:
obtaining, by the control device after performing the first network operation on the mirror simulation network, a third service parameter that is of the mirror simulation network in the running state in a sandbox environment; and generating, by the control device, a first comparison result between the first service parameter and the third service parameter.

5. The method according to claim 4, wherein the service intent indicates to add a first network device to the target network; and wherein obtaining, by the control device after performing the first network operation on the mirror simulation network, the third service parameter that is of the mirror simulation network in the running state comprises:

obtaining, by the control device after the first network device is added to the mirror simulation network, a third service parameter that is of the first network device in a running state.

6. The method according to claim 2, wherein determining, by the control device, the type of the verification content comprises:

generating, by the control device, the type of the verification content based on the service intent.

7. The method according to claim 6, wherein after generating, by the control device, the type of the verification content based on the service intent, the method further comprises:

obtaining, by the control device, second modification information, wherein the second modification information indicates to modify the type of the verification content; and modifying, by the control device, the type of the verification content based on the second modification information.

8. The method according to claim 7, further comprising:
sending, by the control device, first configuration information to the target network based on the first verification result meeting a preset requirement, wherein the first configuration information indicates to the target network to perform configuration related to the first network operation.

9. The method according to claim 7, further comprising:
generating, by the control device, a first network operation solution based on the first verification result not meeting a preset requirement, wherein the first network operation solution indicates to continue to perform a second network operation on the mirror simulation network, so that a second verification result obtained by performing simulation verification on the mirror simulation network based on the verification content meets the preset requirement.

10. The method according to claim 9, wherein after generating, by the control device, the first network operation solution based on the first verification result not meeting the preset requirement, the method further comprises:

performing, by the control device, the second network operation on the mirror simulation network based on the first network operation solution; and performing, by the control device after performing the second network operation on the mirror simulation network, simulation verification on the mirror simulation network based on the verification content, to obtain the second verification result.

11. The method according to claim 10, further comprising:
sending, by the control device, second configuration information to the target network based on the second verification result meeting the preset requirement, wherein the second configuration information indicates to the target network to perform configuration related to the first network operation and configuration related to the second network operation.

12. The method according to claim 7, wherein the method further comprises:
based on the first verification result not meeting a preset requirement, generating, by the control device, a second network operation solution;
performing, by the control device, a third network operation on the mirror simulation network based on the second network operation solution;
performing, by the control device after performing the third network operation on the mirror simulation network, simulation verification on the mirror simulation network based on the verification content, to obtain a third verification result that meets the preset requirement; and
sending, by the control device, third configuration information to the target network, wherein the third configuration information indicates to the target network to perform configuration related to the first network operation and configuration related to the third network operation.

13. The method according to claim 12, further comprising:
sending a packet to the target network, wherein the packet indicates to the target network to perform a dialing test; and
obtaining a dialing test result, to determine that the dialing test result meets the preset requirement.

14. The method of claim 1, the first service parameter comprises a target performance value for the first network operation on the target network.

15. An apparatus, comprising:
at least one processor; and
a non-transitory computer-readable storage medium storing a program that is executable by the at least one processor, the program including instructions to:
obtain a service intent, wherein the service intent indicates to perform a first network operation on a target network, and the service intent indicates to adjust an access-control list of a second network device in the target network;
obtain a mirror simulation network corresponding to the target network;
determine verification content, wherein the verification content indicates to perform simulation verification on a running state of the mirror simulation network, the verification content comprises service information, and determining the verification content comprises:
obtaining a first service parameter that is of the target network in a running state, wherein the first service parameter is based on information obtained from performing the first network operation on the target network;
perform the first network operation on the mirror simulation network based on the service intent; and
perform, after the first network operation is performed on the mirror simulation network, simulation verification on the mirror simulation network based on the verification content, to obtain a first verification result comprising obtaining, after the access-control list of the second network device in the target network is adjusted, a service flow that passes through the second network device, wherein the first verification result is used to evaluate impact of the first network operation on the target network.

16. The apparatus according to claim 15, wherein determining the verification content comprises:
   determining a type of the verification content; and
   obtaining the verification content based on the type of the verification content.

17. The apparatus of claim 15, the first service parameter comprises a target performance value for the first network operation on the target network.

18. A non-transitory computer-readable storage medium storing one or more computer-executable instructions, wherein when the computer-executable instructions are executed by a processor, the processor is caused to:
   obtain a service intent, wherein the service intent indicates to perform a first network operation on a target network, and the service intent indicates to adjust an access-control list of a second network device in the target network;
   obtain a mirror simulation network corresponding to the target network;
   determine verification content, wherein the verification content indicates to perform simulation verification on a running state of the mirror simulation network, the verification content comprises service information, and determining the verification content comprises:
      obtaining a first service parameter that is of the target network in a running state, wherein the first service parameter is based on information obtained from performing the first network operation on the target network;
   perform the first network operation on the mirror simulation network based on the service intent; and
   perform, after the first network operation is performed on the mirror simulation network, simulation verification on the mirror simulation network based on the verification content, to obtain a first verification result comprising obtaining, after the access-control list of the second network device in the target network is adjusted, a service flow that passes through the second network device, wherein the first verification result is used to evaluate impact of the first network operation on the target network.

19. The non-transitory computer-readable storage medium according to claim 18, wherein determining the verification content comprises:
   determining a type of the verification content; and
   obtaining the verification content based on the type of the verification content.

20. A method, comprising:
   obtaining, by a control device, a service intent, wherein the service intent indicates to perform a first network operation on a target network, and to adjust an access-control list of a second network device in the target network;
   obtaining, by the control device, a mirror simulation network corresponding to the target network;
   determining, by the control device, verification content, wherein the verification content is used to perform simulation verification on a running state of the mirror simulation network;
   performing, by the control device, the first network operation on the mirror simulation network based on the service intent; and
   performing, by the control device after performing the first network operation on the mirror simulation network, simulation verification on the mirror simulation network based on the verification content, to obtain a first verification result comprising obtaining, by the control device after the access-control list of the second network device in the target network is adjusted, a service flow that passes through the second network device, wherein the first verification result is used to evaluate impact of the first network operation on the target network.

* * * * *